(12) United States Patent
Masino et al.

(10) Patent No.: US 9,073,029 B2
(45) Date of Patent: Jul. 7, 2015

(54) SYSTEM AND METHOD FOR DETERRING FOULING IN A POLYMERIZATION REACTOR

(71) Applicant: Chevron Phillips Chemical Company LP, The Woodlands, TX (US)

(72) Inventors: Albert P. Masino, Tulsa, OK (US); Randall S. Muninger, Dewey, OK (US); Max P. McDaniel, Bartlesville, OK (US); Eric D. Schwerdtfeger, Bartlesville, OK (US); Qing Yang, Bartlesville, OK (US); Graham R. Lief, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/036,422

(22) Filed: Sep. 25, 2013

(65) Prior Publication Data

US 2015/0087793 A1    Mar. 26, 2015

(51) Int. Cl.
| | |
|---|---|
| *C08F 4/649* | (2006.01) |
| *C08F 4/6592* | (2006.01) |
| *C08F 4/642* | (2006.01) |
| *C08F 210/16* | (2006.01) |
| *C08F 10/00* | (2006.01) |
| *B01J 4/02* | (2006.01) |
| *C08F 110/02* | (2006.01) |
| *B01J 19/24* | (2006.01) |
| *B01J 19/00* | (2006.01) |
| *C08F 4/659* | (2006.01) |

(52) U.S. Cl.
CPC ............... *B01J 4/02* (2013.01); *C08F 110/02* (2013.01); *B01J 19/2455* (2013.01); *B01J 19/0006* (2013.01); *B01J 2204/002* (2013.01); *B01J 2219/00247* (2013.01); *C08F 210/16* (2013.01); *C08F 4/65916* (2013.01); *C08F 4/65912* (2013.01); *C08F 4/65927* (2013.01); *C08F 4/6592* (2013.01); *C08F 4/649* (2013.01)

(58) Field of Classification Search
CPC ........ C08F 4/649; C08F 4/6592; C08F 10/00; C08F 4/65912; C08F 4/65916; C08F 4/65927; C08F 210/16
USPC .......... 502/103, 123, 152; 526/141, 143, 160, 526/165, 348, 943
See application file for complete search history.

(56) References Cited

U.S. PATENT DOCUMENTS

| | | | |
|---|---|---|---|
| 6,100,214 | A | 8/2000 | Walzer et al. |
| 6,916,892 | B2 | 7/2005 | Tharappel et al. |
| 7,354,880 | B2 | 4/2008 | Agapiou et al. |
| 7,417,097 | B2 | 8/2008 | Yu et al. |
| 2002/0004448 | A1 | 1/2002 | Agapiou et al. |

FOREIGN PATENT DOCUMENTS

WO        99/51648        10/1999

OTHER PUBLICATIONS

Data Sheet Stadis (R) 450. Sep. 15, 2004.
International Application PCT/US2014/056613 Search Report dated Nov. 20, 2014.

*Primary Examiner* — Caixia Lu
(74) *Attorney, Agent, or Firm* — Fletcher Yoder, PC

(57) ABSTRACT

A catalyst composition may include a precontacted mixture of an olefin polymerization catalyst and an agent including an ammonium salt. The catalyst activity of the catalyst composition in the presence of water may be greater than if no ammonium salt were present in the catalyst composition. The ammonium salt may include a tetraalkylammonium salt, and the olefin polymerization catalyst may include a metallocene compound.

24 Claims, 3 Drawing Sheets

SYSTEM AND METHOD FOR DETERRING FOULING IN A POLYMERIZATION REACTOR

BACKGROUND

The present techniques relate to the field of organometallic compositions, olefin polymerization catalyst compositions, and methods for the polymerization and copolymerization of olefins using a catalyst composition.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As methods, processes, and equipment within chemical and petrochemical technologies advance, the higher-quality, lower cost materials and products that result become more and more prolific in our everyday lives. In particular, simple molecular building blocks (or monomers) may be brought together into longer chains (or polymers), through a chemical process called polymerization to yield these materials. Polyolefins, a type of polymer widely consumed on an everyday basis, may be produced from various olefin monomers and one or more catalysts. Plastic products from polyolefins are used for retail and pharmaceutical packaging (such as display bags, bottles, and medication containers), food and beverage packaging (such as juice and soda bottles), household and industrial containers (such as pails, drums and boxes), household items (such as appliances, furniture, carpeting, and toys), automobile components, fluid, gas and electrical conduction products (such as cable wrap, pipes, and conduits), and various other industrial and consumer products. The wide variety of residential, commercial and industrial uses for polyolefins has translated into a substantial demand for raw polyolefin which can be extruded, injected, blown or otherwise formed into a final consumable product or component.

Because of this large demand, polyolefin polymers are generally produced using large-scale polymerization reactors, which can produce tons of polyolefin product in short periods of time. In typical polyolefin reaction processes, various components are added to the polymerization reactor, which subjects the components to appropriate conditions to cause the polymerization of monomer to occur. The components can include olefin feed components, diluent components, catalyst system components, and other additives. Upon introducing, for instance, monomer (e.g., ethylene), comonomer (e.g., hexene), and a catalyst system (e.g., a metallocene catalyst) into the polymerization reactor under polymerization conditions, the polymerization reaction process begins to produce a polymer.

Because these polymerization processes are typically performed on a very large scale and, in some instances, on a continuous basis, the reaction conditions within the polymerization reactor may be carefully controlled in an effort to maintain the quality and reproducibility of the polymer product. Indeed, the polymerization reaction conditions and the types of materials used in the polymerization reaction may determine the physical and chemical properties of the polyolefin product, which can be of paramount importance to the polymer product's marketability and ultimate use. However, despite advances within polymerization technologies over the past few decades, consistently obtaining polyolefins with specific properties remains a difficult task, as precise control over polymerization reaction variables is among the more difficult hurdles associated with polyolefin production.

For example, in some circumstances the polymerization conditions may cause a reactor to foul, such as when the polymerized product is formed on the reactor walls or when the product cannot be maintained as a slurry. Fouling may result in a loss in heat transfer, such as due to a reduction in circulation or reduced efficiency at a heat exchanger interface, which may impair or completely negate the capacity to maintain the desired temperature within the reactor. A reactor foul may also result in a reduction in the circulation of the reactor contents and/or in a variation from the desired percent solids (measured by volume or by weight) of the reactor slurry. The weight percent solids (solids wt %) in the reactor may be defined as the ratio of polymer to the total reactor contents. To the extent that a reactor foul may result in deviations from the desired reaction conditions, the polymer product produced during such a reactor foul may not meet the desired specifications; that is, the product may be "off-spec." In extreme or runaway fouling situations, control of the reaction may be lost entirely, and the reactor may become plugged with polymer, requiring one to three weeks to clear, during which time the reactor may not be operated.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
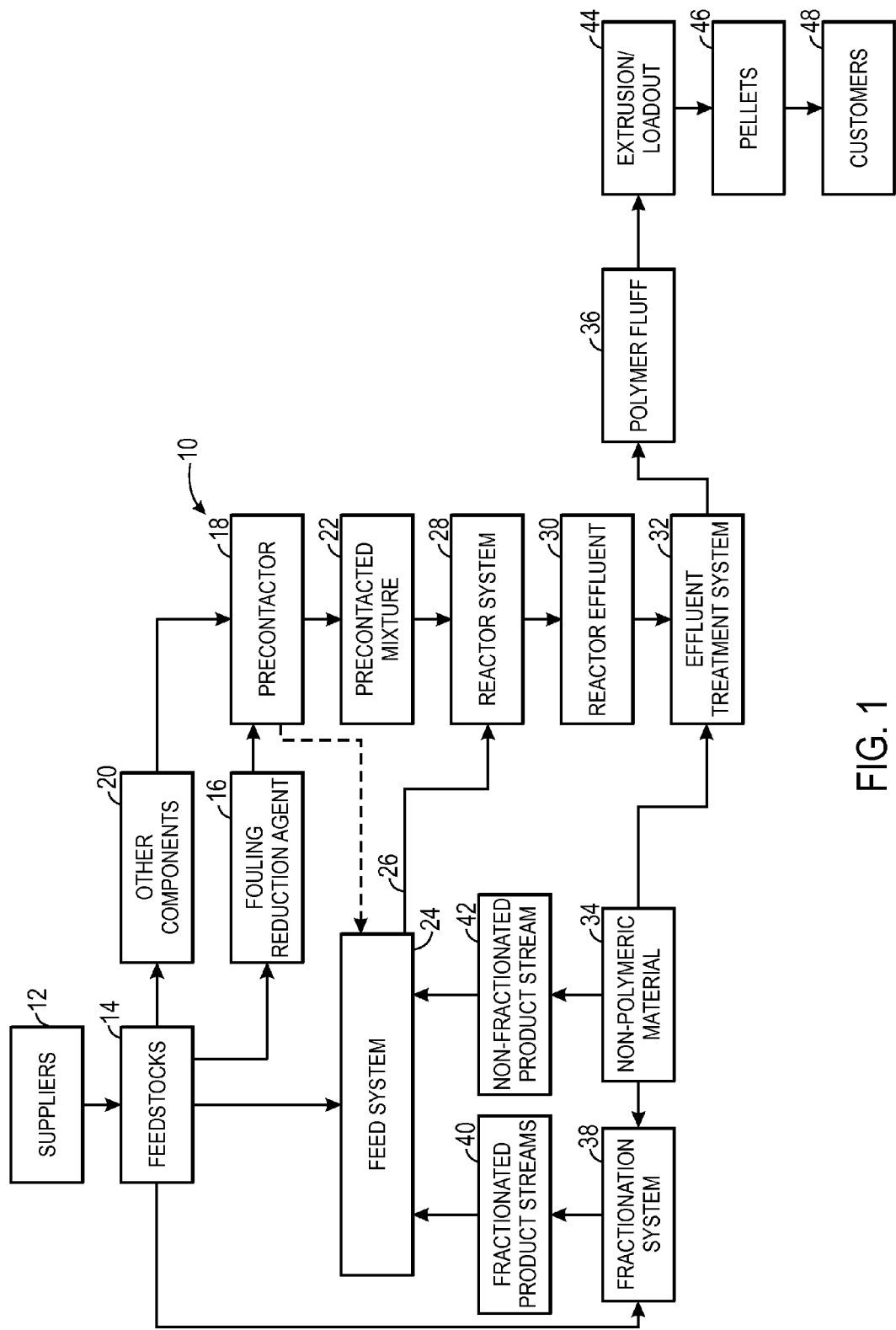
FIG. 1 is a block flow diagram depicting a polyolefin manufacturing system for the continuous production of polyolefins in accordance with an embodiment of the present techniques.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

One factor that greatly affects the conditions within a polymerization reactor is the activity of the catalyst used to facilitate the polymerization process. Catalyst activity is typically understood to represent how well a catalyst performs under specific conditions. In its strictest sense, a catalyst's activity can be measured based on how it affects the kinetics (e.g., a reaction rate) of a particular chemical transformation or reaction sequence, and is therefore usually associated with a conversion rate measured under particular conditions. In the field of large-scale polymerization, catalyst activity is often measured in a more practical manner—the quantity of polymer produced for a given quantity of catalyst under a given set of conditions and within a certain amount of time. Catalyst productivity also provides a measure of the ability of a catalyst to facilitate a particular polymerization. As used herein, "catalyst productivity" is intended to denote a quantity of polymer produced per quantity of catalyst (e.g., kilograms of polymer per grams or milligrams of catalyst), while "catalyst activity" is the catalyst's productivity over time.

Different catalysts may have different activities and/or productivities, and each catalyst may behave differently in the presence of different reactants. Because of this, the types and quantities of reactants (e.g., monomers, comonomers) and the types and quantities of catalysts are generally controlled so as to balance polymer production quantity, polymer quality, and polymer production rate, while also preventing conditions that could lead to a reactor foul. Therefore, in the context of polymerization reactions (e.g., in large scale polymer production), many factors can affect the overall effect of a catalyst on the polymerization process. These include, among other things, the respective concentrations of various polymerization components (e.g., monomer, co-monomer) as well as other components that may not necessarily be desirable, such as catalyst poisons or other contaminants (e.g., aldehydes, water). It should be noted that any discussions below associated with catalyst activity are also intended to encompass effects on catalyst productivity, though catalyst activity may provide a more accurate representation of the effects on various materials on a given catalyst or catalyst system, at least because catalyst activity also provides information related to a rate of production.

Indeed, catalyst poisons and certain other materials can have a number of undesirable affects, such as a decrease in polymer production, polymer agglomeration, and, in some cases, reactor fouling. Of particular concern is water, which can be present within essentially any feedstock, for example in recycled diluent. Many times, feedstocks are treated before being used in a polymerization reaction to remove as much water as possible, such as by distilling and/or contacting the feedstock with a drying agent. Unfortunately, these treatment methods, while effective, can still leave traces of water that can negatively affect polymerization reactions. Indeed, on an industrial scale, 2 parts per million (ppm) water can represent a large quantity of water in the reactor.

In metallocene-based catalyst systems, water can cause the catalyst to behave undesirably, which can lead to fouling. While not wishing to be bound by theory, it is believed that the water may cause the metallocene catalyst system to solubilize (e.g., be removed from a solid support), causing the catalyst to have unpredictable activity and/or productivity. It should be noted that while the effect of this fouling can be polymer adherence to reactor walls and other devices (e.g., mixing devices), this type of fouling is different from static-based fouling. Specifically, it is believed that static-based fouling is not a result of a change in catalyst activity and/or productivity, but is due to static buildup on polymer particles, which causes the polymer to adhere to the typically metallic surfaces of the reactor walls and mixing devices. Regardless of the particular manner in which water causes fouling, it would be desirable if a catalyst system were able to tolerate water while still having acceptable levels of activity and productivity to produce desired polymer product.

The present inventors have found, rather surprisingly, that if a polymerization catalyst (e.g., a metallocene olefin polymerization catalyst) is contacted with an ammonium compound, and in particular a tetraalkylammonium compound, before using the catalyst for polymerization, the catalyst composition thus formed may be more tolerant to the presence of water in the polymerization reactor than if the catalyst were not previously contacted with the ammonium compound. The present inventors have also found that the amount and type of ammonium compound contacted with the polymerization catalyst can have a marked effect on whether the polymerization catalyst is able to tolerate the presence of water while maintaining acceptable levels of catalyst activity and/or productivity. In other words, in some embodiments, the unexpected results that the present inventors have achieved may be manifest when certain ammonium compounds and the catalyst are contacted in certain relative concentrations. Example compounds and ranges are discussed in detail below.

The conditions under which the ammonium compound and the polymerization catalyst are contacted may also impact the extent to which the catalyst system operates according to the present technique. For example, while present embodiments provide for any contact method to be used, in certain embodiments, one or more catalysts, or one or more catalyst precursors, one or more cocatalysts, one or more activators, or any combination thereof, may be pre-contacted with one or more ammonium compounds (e.g., a tetraalkylammonium) in a precontactor upstream of a polymerization reactor, thereby forming a pre-contacted mixture and, eventually, a catalyst composition.

Contacting the ammonium compound with the catalyst in this manner may be desirable to ensure that the contact occurs before the catalyst is introduced into a polymerization reactor (a polymerization zone) operating under polymerization conditions (e.g., before having the opportunity to begin polymerization by contacting monomer under a temperature, pressure, and concentration sufficient to cause polymerization). Furthermore, precontacting the ammonium compound and the catalyst (and/or catalyst precursor) ensures that the ammonium compound and the catalyst have sufficient opportunity to interact, which would otherwise be much more difficult to ensure if the ammonium compound and the catalyst were separately introduced into the polymerization reactor (e.g., at different areas of the reactor and/or at different times). This is particularly true when considering the relatively small amount of the ammonium compound used in accordance with the present technique compared to the volume of material circulating within the reactor. Indeed, the amount of ammonium compound may be, in some embodiments, much less than an amount that would be used for a more traditional additive, such as an antistatic agent.

Once formed, the catalyst systems of the present techniques are intended for any olefin polymerization method, using various types of polymerization reactors. As used herein, "polymerization reactor" includes any polymerization reactor capable of polymerizing olefin monomers (e.g., ethylene, hexene) to produce homopolymers or copolymers. Indeed, while any suitable polymerization reactor may be used, including batch, slurry, gas-phase, solution, high pressure, tubular or autoclave reactors, or any combination thereof, the present techniques will be presented in the context of a loop slurry polymerization reactor to facilitate discussion. However, it should be noted that the discussion set forth below is intended to be applicable, as appropriate, to any polymer manufacturing systems having any one or a combination of polymerization reactors and/or polymerization zones. Furthermore, the present embodiments are also intended to be applicable to procedures where the catalyst and ammonium compound are contacted with one another in a polymerization reactor, before the polymerization reactor is operated under polymerization conditions. In this way, a polymerization reactor, before polymerization, may at least partially simulate the environment within a precontactor.

With this in mind, various sections are set forth below to facilitate discussion of the present techniques. In particular, Section I provides an overview of an embodiment of a polyolefin production process that may utilize one or more ammonium compounds as fouling mitigation agents. The polyolefin production process includes examples of systems configured to facilitate receiving feedstocks, including the ammonium compounds, systems configured to prepare the feedstocks for the polymerization, and various systems configured to process effluent from a reactor system to produce a polymer product.

Section II provides an example embodiment of a reactor system that may utilize one or more ammonium compounds as fouling mitigation agents. The reactor system may include features that may be used to control the flow of various feeds into the reactor system and into a precontactor. The features may include a control system configured to produce a catalyst composition in accordance with the present technique. Section II also provides examples of monomers, comonomers, and various other polymerization components (additives) that may be used in the polymerization process.

Section III provides example embodiments of catalyst compositions and components in accordance with embodiments of the present techniques. The catalyst compositions and components include example fouling reduction agents, example metallocene compounds, example solid activator-supports, example organoaluminum compounds as cocatalysts, example organoaluminoxane compounds as cocatalysts, example organoboron compounds as cocatalysts, example ionizing compounds as cocatalysts, and non-limiting examples of catalyst compositions.

Section IV provides example embodiments of processes that may be used to produce a catalyst composition having a precontacted mixture of a catalyst and a fouling reduction agent. The processes may include precontacting a fouling reduction agent, a catalyst, a cocatalyst, a solid activator-support, and other optional components before introducing the catalyst composition into a polymerization reactor, or before carrying out polymerization using the catalyst composition. Example relative amounts for the fouling reduction agent, catalyst, cocatalyst, and solid activator-support are also provided.

Section V provides example properties of the catalyst composition produced in accordance with the present techniques when used in polymerization reactions. Example methods of determining relative fouling mitigation ability, catalyst activity and/or productivity, and water tolerance are also provided.

In addition to the various sections noted above, comparative examples of embodiments of the present technique are also provided. The examples include a control, where fouling was intentionally initiated by the injection of water. The examples also include reactions where different fouling mitigation agents, including polymeric mixtures and tetraalkylammonium salts, were used to mitigate fouling due to water. In certain of the examples, fouling was either substantially or totally mitigated, while catalyst activity was substantially unaffected.

I. Polyolefin Production Process—An Overview

In the production of polyolefins, polymerization reactors, which polymerize monomers into polyolefins, and extruders, which convert the polyolefins into polyolefin pellets, are typically components of polymerization systems undergoing continuous operation. However, a variety of both continuous and batch systems may be employed throughout the polyolefin production process. Turning now to the drawings, and referring initially to FIG. 1, a block diagram depicts an exemplary manufacturing process 10 for producing polyolefins, such as polyethylene homopolymer, copolymer, and/or terpolymer, or any other polymer. Various suppliers 12 may provide reactor feedstocks 14 to the manufacturing system 10 via pipelines, trucks, cylinders, drums, and so forth. The suppliers 12 may include off-site and/or on-site facilities, including olefin plants, refineries, catalyst plants, on or off-site laboratories, and the like. Examples of possible feedstocks 14 include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as aluminum alkyl, alkyl boron, and alkyl aluminoxane), solid activator-supports (e.g., solid oxides, solid oxides treated with electron-withdrawing groups) and other additives such as antiblock agents, antistatic agents, colorants, and the like. In the case of ethylene monomer, as an example, ethylene feedstock may be supplied via pipeline at approximately 800-1450 pounds per square inch gauge (psig) at 45-65° F. As another example, hydrogen feedstock may be supplied via pipeline at approximately 900-1000 psig at 90-110° F. Of course, a variety of supply conditions may exist for ethylene, hydrogen, and other feedstocks 14.

In accordance with present embodiments, the feedstocks 14 may include a fouling reduction agent 16. As discussed in further detail below, the fouling reduction agent 16 may include an ammonium salt, such as a tetraalkylammonium salt, an ionic liquid, a polymer or polymeric mixture having the ammonium salt, a mixture having an amine-containing polymer and an acid, or any combination thereof. As depicted, the fouling reduction agent 16 may be provided to a precontactor 18, where the fouling reduction agent 16 is able to interact with certain other components 20 of the polymerization reaction. These other components 20 may generally include, but are not necessarily limited to, one or more polymerization catalysts, catalyst precursors, and/or cocatalysts. Example components include metallocene catalysts, solid super acid (SSA) activator-supports, organoaluminoxane compounds, organoaluminum compounds, Ziegler-Natta catalysts, one or more diluents, or any combination thereof. In addition, in certain embodiments, the other components 20 provided to the precontactor 18 will generally exclude monomeric components, such as olefin monomers (e.g., α-olefin monomers such as ethylene and 1-hexene). However, in other embodiments, 1-hexene may be a part of the precontacted mixture in order to enhance catalyst productivity and/or activity.

In certain embodiments, the precontactor 18 is used to form a precontacted mixture 22, which may include a catalyst system prepared in accordance with the present techniques. Indeed, the precontactor 18 may receive or otherwise control (e.g., meter) the relative amounts of contact components (e.g., catalyst, fouling reduction agent 16, diluent) in order to precisely control the relative amount of each component to achieve the reduction in fouling described herein. In embodiments where the amounts of each of these components is controlled by another system (e.g., a control system and/or a feed system), the control system may precisely control the relative amounts of these components in order to achieve the same. Such embodiments are discussed in further detail below with respect to FIG. 2. Further, it should be noted that the precontactor 18 illustrated in FIG. 1 is merely intended to be an example, and in an actual implementation, may represent one or more precontactors that each generate a respective precontacted mixture. In such embodiments, the fouling reduction agent 16 may be provided to any one or a combination of these precontactors.

In this regard, in embodiments where more than one precontactor is used (e.g., in situations where a catalyst precursor is contacted with a series of compounds in a series of precontactors), the fouling reduction agent 16 may be mixed at any stage and in any of the precontactors, as long as the contact occurs prior to polymerization. In this way, the fouling reduction agent 16 may be contacted with a first precontacted mixture produced from a catalyst or catalyst precursor, a second precontacted mixture produced from the catalyst or the catalyst precursor, a third precontacted mixture produced from the catalyst or the catalyst precursor, and so on. The fouling reduction agent 16 may also be contacted with the catalyst in any one or a combination of precontactors, such that the fouling reduction agent 16 may have one or more than one opportunity to interact with the catalyst.

The precontactor 18 (or precontactors) may individually be separate from, communicatively coupled to (e.g., fluidly coupled to), and/or may be a part of, a reactor feed system 24 configured to provide one or more feed streams 26 to one or more polymerization reactors of a reactor system 28. The feed system 24 may receive one or more of the feedstocks 14 from the suppliers 12, where the feedstocks 14 may be stored. The feedstocks 14 may be stored in any suitable vessel, such as in monomer storage and feed tanks, diluent vessels, catalyst tanks, co-catalyst cylinders and tanks, and so forth. In certain embodiments, certain feedstocks 14 may be treated or processed within the feed system 24 before being provided to the precontactor 18. For instance, a diluent may be distilled or otherwise subjected to some form of purification, catalysts (or portions of the catalyst) may be calcined, activated by activator components, or otherwise pretreated.

Further, feedstocks 14 such as monomer, comonomer, and diluent, may be sent through treatment beds (e.g., molecular sieve beds, aluminum packing, etc.) to remove catalyst poisons in the feed system 24. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor or reactors within the reactor system 28. Furthermore, in operation, the feed system 24 may also store, treat, and meter recovered reactor effluent for recycle to the reactor system 28. Indeed, operations in the feed system 28 generally receive both the feedstock 14 and recovered reactor effluent streams. In certain embodiments, the recovered effluent streams may be a potential source of water contamination.

In total, the feedstocks 14 and recovered reactor effluent are processed in the feed system 24 and fed as the feed streams 26 (e.g., streams of monomer, comonomer, diluent, catalysts, co-catalysts, hydrogen, additives, or combinations thereof) to the reactor system 28. Further, the feed system 24 typically provides for metering and controlling the addition rate of the feedstocks 14 into the reactor system 28 to maintain the desired reactor stability and/or to achieve the desired polyolefin properties or production rate.

The reactor system 28 may include one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

Figure 2:
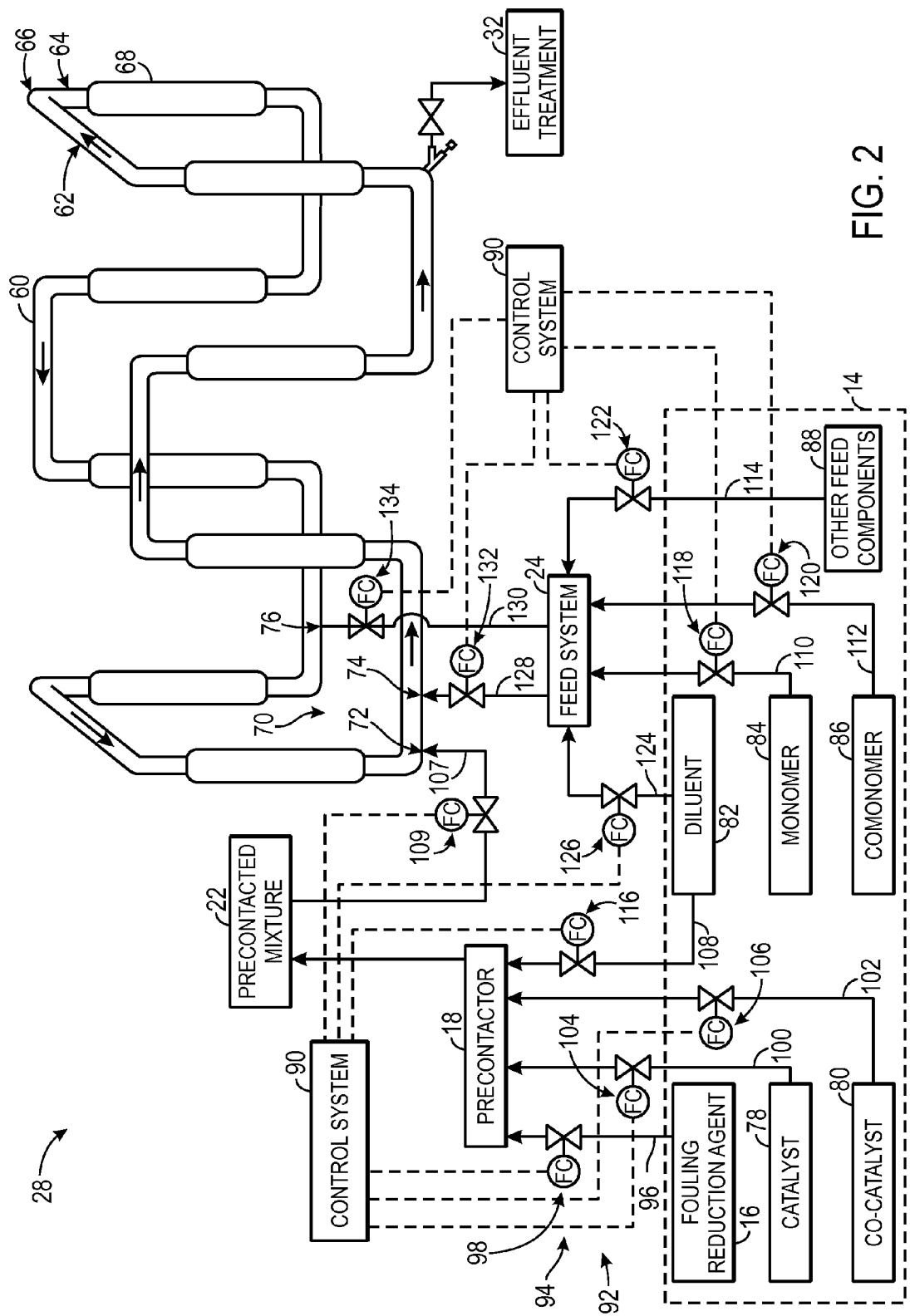
FIG. 2 is a schematic overview of a reactor system having a precontactor, where the precontactor is configured to generate a catalyst system before introduction into a polymerization reactor, in accordance with an embodiment of the present techniques.

In certain embodiments, the reactor system 28 may include a loop slurry reactor, an example of which is discussed below with respect to FIG. 2. Such reactors may include vertical or horizontal loops. Monomer, diluent, catalyst and, in some embodiments, comonomer may be continuously fed to the loop reactor where polymerization occurs. Generally, continuous processes may include the continuous introduction of a monomer, the catalyst system formed in accordance with present embodiments (e.g., precontacted mixture 22), and a diluent into a polymerization reactor and the continuous removal from this reactor of a suspension including polymer particles (commonly referred to as fluff or granules) and the diluent. Reactor effluent 30, as discussed below, may be flashed to remove the solid polymer from the liquids that include the diluent, monomer and/or comonomer. Loop slurry polymerization processes (also known as the particle form process) are disclosed, for example, in U.S. Pat. Nos. 3,248,179, 4,501,885, 5,455,314, 5,565,175, 5,575,979, 6,239,235, 6,262,191 and 6,833,415, each of which is incorporated by reference in its entirety herein for all purposes.

Additionally or alternatively, the reactor system 28 may include a gas phase reactor. Such systems may employ a continuous recycle stream containing one or more monomers continuously cycled through a fluidized bed in the presence of the catalyst (e.g., the catalyst having been contacted with the fouling reduction agent 16) under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may include a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Example gas phase reactors are disclosed in U.S. Pat. Nos. 5,352,749, 4,588,790 and 5,436,304, each of which is incorporated by reference in its entirety herein for all purposes.

According to still another aspect of the techniques, the reactor system 28 may, in addition to or in lieu of other types of reactors, include a high pressure polymerization reactor. By way of example, the high pressure reactor may include a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components (e.g., a contacted mixture of the fouling reduction agent 16 and the catalyst) may be entrained in a gaseous stream and introduced at another zone of the reactor. The gas streams may be intermixed for polymerization. Heat and pressure may be employed appropriately to obtain appropriate polymerization reaction conditions.

According to yet another aspect of the techniques, the reactor system 28 may, in addition to or in lieu of other types of reactors, include a solution polymerization reactor wherein the monomer may be contacted with the catalyst composition (e.g., a contacted mixture of the fouling reduction agent 16 and the catalyst) by suitable stirring or other agitation features. A carrier including an inert organic diluent or excess monomer may be employed. If desired, the monomer may be brought in the vapor phase into contact with the catalytic reaction product, in the presence or absence of liquid material. The polymerization zone may be maintained at temperatures and pressures that will result in the formation of a solution of the polymer in a reaction medium. Agitation may be employed to obtain better temperature control and to maintain uniform polymerization mixtures throughout the polymerization zone. The exothermic heat of polymerization may be dissipated using adequate cooling media, such as a coolant within a cooling jacket, air from a heat rejection system, or the like.

The particular type of reactor or reactors used within the reactor system 28 may determine, at least in part, the throughput of the reactor system 28 and the properties of the polymer product that may be obtained. For example, the reactor effluent 30, as noted above, may include polymer particulates (e.g., fluff or granules) having one or more melt, physical, rheological, and/or mechanical properties of interest, such as density, melt index (MI), melt flow rate (MFR), copolymer or comonomer content, modulus, and crystallinity. Operating parameters of the one or more reactors of the reactor system 28, such as temperature, pressure, flow rate, mechanical agitation, product takeoff, component concentrations, polymer production rate, and so forth, may be selected to achieve the desired polymer properties.

After leaving the reactor system 28, the reactor effluent 30 may be subsequently processed, such as by an effluent treatment system 32, to separate non-polymer components 34 (e.g., diluent, unreacted monomer, and catalyst) from polymer fluff 36. The recovered non-polymer components 34 may be processed, such as by a fractionation system 38, to remove heavy and light components. Fractionated product streams 40 may then be returned to the reactor system 28 via the feed system 24. In addition, some or all of the non-polymer components 34 may recycle more directly to the feed system 24 via a non-fractionated product stream 42, bypassing the fractionation system 38. Additionally, in some embodiments, the fractionation system 38 may perform fractionation of the feedstocks 14 before introduction into the feed system 24. For example, monomer components may be separated from diluent components, such that any one or combination of polymerization components may be controllably fed into the reactor system 28.

The polymer fluff 36 may be further processed within the effluent treatment system 32 and/or in an extrusion/loadout system 44, as described below. Although not illustrated, polymer granules and/or active residual catalyst intermediate in the effluent treatment system 32 may be returned to the reactor system 28 for further polymerization, such as in a different type of reactor or under different reaction conditions.

In the extrusion/loadout system 44, the polymer fluff 36 is typically extruded to produce polymer pellets 46 with the desired mechanical, physical, and melt characteristics. Extruder feed may contain additives, such as UV inhibitors and peroxides, which are added to the polymer fluff 36 to impart desired characteristics to the extruded polymer pellets 46. An extruder/pelletizer within the extrusion/loadout system 44 receives the extruder feed, containing the polymer fluff 36 and whatever additives have been added. The extruder/pelletizer heats and melts the extruder feed which then may be extruded (e.g., via a twin screw extruder) through a pelletizer die of the extrusion/loadout system 44 under pressure to form the polyolefin pellets 46. Such pellets 46 may be cooled in a water system disposed at or near the discharge of the extruder/pelletizer.

In general, the polyolefin pellets may then be transported to a product load-out area where the pellets may be stored, blended with other pellets, and/or loaded into railcars, trucks, bags, and so forth, for distribution to customers 48. In the case of polyethylene, the pellets 46 shipped to the customers 48 may include low density polyethylene (LDPE), linear low density polyethylene (LLDPE), medium density polyethylene (MDPE), high density polyethylene (HDPE), and enhanced polyethylene. The various types and grades of polyethylene pellets 46 may be marketed, for example, under the brand names Marlex® polyethylene or MarFlex™ polyethylene of Chevron-Phillips Chemical Company, LP, of The Woodlands, Tex., USA.

The produced polyolefin (e.g., polyethylene) pellets 46 may be used to produce a variety of articles of manufacture, including both household consumer products and industrial products. By way of non-limiting example, such articles may include adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. To form end-products or components from the pellets 46, the pellets 46 are generally subjected to further processing, such as blow molding, injection molding, rotational molding, blown film, cast film, extrusion (e.g., sheet extrusion, pipe and corrugated extrusion, coating/lamination extrusion, etc.), and so on.

II. Mitigating Fouling in a Polymerization Reactor

As noted above, the present technique may be applicable to any polymerization reaction (e.g., olefin polymerization reaction) performed in any appropriate polymerization reactor having one or more polymerization zones. Indeed, the catalyst systems formed in accordance with the present approach may be utilized in a variety of reactors in order to mitigate fouling of the reactor, and in particular fouling due to the presence of water, which can cause solid polymer, formed from polymerization, to adhere to various reactor features (e.g., impellers, mixing devices, reactor walls). One example of the reactor system 28 that may benefit from the present technique is depicted in FIG. 2. In particular, FIG. 2 depicts an embodiment of the reactor system 28 having a loop slurry reactor 60 fluidly coupled to the precontactor 18, the feed system 24, and the effluent treatment system 32. The loop slurry reactor 60, as depicted, includes segments of pipe (e.g., horizontal segments 62 and vertical segments 64) connected by smooth bends or elbows 66. In these segments, polymerization components and other materials received from the precontactor 18 and the feed system 24 are circulated and subjected to polymerization conditions (e.g., appropriate temperature and pressure for polymerization).

Heat exchange devices 68 (e.g., cooling jackets) may be positioned in a heat exchange relationship with one or more of the segments, which may be desirable to maintain the polymerization reaction within a desired temperature range. For example, the polymerization reaction may be exothermic, or heat-generating, which can increase the rate of polymerization. Accordingly, in such embodiments, the heat exchange devices 68 may reduce the temperature of the components circulating within the loop slurry reactor 60 in order to assist in maintaining a desired polymerization rate. As an example, during operation, a cooling fluid may be circulated within the cooling jackets as needed to remove the generated heat and to maintain the temperature within the desired range, such as between approximately 150° F. to 250° F. (65° C. to 121° C.) for polyethylene. Either or both of the reactor temperature and coolant duty may be monitored to determine the presence of a foul, or whether a particular fouling mitigation agent 16 is operating as desired.

As the components circulate within the loop slurry reactor 60, for example via the action of a motive device (e.g., a pump having an impeller positioned in the interior of the loop slurry reactor 60), the polymerization reaction progresses and forms polymer. As noted above, in certain fouling situations, the polymer may adhere to the inner walls of the reactor 60. For example, solid polymer may adhere to interior walls of the horizontal segments 62, the vertical segments 64, the elbows 66, portions of a motive device (e.g., blades of an impeller) or any combination thereof. In these situations, circulation of the materials may be difficult, and can result in downtime of the reactor. In certain embodiments, fouling in this manner may be at least partially attributable to the presence of water in the polymerization reaction. Indeed, it should be noted that water may be present in certain recycled components, such as diluent recycled from the effluent treatment system 32, and even in certain feedstocks 14 obtained directly from a supplier. A load of the motive device may also be monitored to determine the presence of a foul, or whether a particular fouling mitigation agent 16 is operating as desired.

In accordance with present embodiments and as noted above, certain components provided from the precontactor 18 and/or the feed system 24 may assist in mitigating this and other types of fouling. The precontactor 18 and the feed system 24 may introduce various components by way of one or more reactor inlets 70. The one or more inlets 70 may include reactor tap-ins, injection ports, or other types of features configured to introduce components into a polymerization zone of the reactor 60. The one or more inlets 70 may be positioned on any one or a combination of the horizontal segments 62, the vertical segments 64, and/or the elbows 66. In certain embodiments, respective positions of the one or more inlets 70 may facilitate introduction of the components into the loop slurry reactor 60. For instance, one or more of the inlets 70 may be positioned upstream of a motive device (e.g., a pump, impeller, paddle stirrer), and/or on one or more of the vertical segments 64 to enable the components to be drawn into a reaction zone of the loop slurry reactor 60.

As shown by example in the illustrated embodiment, the one or more inlets 70 may include a precontactor inlet 72 configured to enable the reactor 60 to receive the precontacted mixture 22 from the precontactor 18, and first and second feed system inlets 74, 76 configured to enable the reactor 60 to receive various feedstocks 14 from the feed system 24. In accordance with present embodiments, the precontactor 18 may produce the precontacted mixture 22 by precontacting the fouling reduction agent 16 with a catalyst 78 and/or a cocatalyst 80 while other components of the feed system 24 (e.g., storage vessels, treatment vessels) may store, treat, and/or provide monomer, comonomer, diluent, and/or various additives of the feedstock 14 to the loop slurry reactor 60. In certain embodiments, components of the feed system 24 may provide the fouling reduction agent 16, the catalyst 78, the cocatalyst 80, and other components to the precontactor 18.

For instance, other components of the feedstock 14 that may be provided to the precontactor 18 may include a diluent 82, which may be desirable to enable the fouling reduction agent 16 to appropriately interact with the catalyst 78 and/or the cocatalyst 80. The diluent 82 may serve as a solvent for the fouling reduction agent 16, the catalyst 78, the cocatalyst 80, or any combination thereof, or may serve to suspend any one or a combination of these components within the precontactor 18. Indeed, the diluent 82 may be fed into the precontactor 18 and the loop slurry reactor 60, though the diluent 82 in the precontactor 18 and the loop slurry reactor 60 may be the same or different, and may include any one or a combination of suitable diluents.

The diluent 82 may be, for example, an inert hydrocarbon that is a liquid or a supercritical fluid at reaction conditions, depending on the desired properties of the polymer fluff or the slurry. The diluent 82 may include isobutane, propane, n-pentane, i-pentane, neopentane, n-hexane, cyclohexane, cyclopentane, methylcyclopentane, ethylcyclohexane, and the like, or combinations thereof. In the reactor 60, the purpose of the diluent 82 is generally to suspend the catalyst particles and polymer. The diluent 82 may also serve as a reaction medium or other homogenizing medium for the formation of the precontacted mixture 22 within the precontactor 18. In certain embodiments, one or more diluents may be utilized in the precontactor 18 and/or the reactor 60. Further, in certain embodiments, the diluent 82 may be present as a liquid, gas, or supercritical fluid, or any combination thereof.

It should be noted that the components provided to the precontactor 18, or any one or a combination of the precontactors in embodiments where multiple precontactors are present, are not limited to the fouling reduction agent 16, the catalyst 78, and the cocatalyst 80. For example, the fouling reduction agent 16, the catalyst 78, and/or the cocatalyst 80 may be first contacted (e.g., in the diluent 82) to form a first precontacted mixture, followed by contact with a monomer 84, comonomer 86, or other feed components 88 (e.g., additives) to form at least one subsequent precontacted mixture (e.g., a second, third, or fourth precontacted mixture).

Examples of the monomer 84 and comonomer 86 include various unsaturated reactants. Such reactants may include olefin compounds having from about 2 to about 30 carbon atoms per molecule and having an olefinic double bond. The present techniques encompass homopolymerization processes using a single olefin such as ethylene or propylene, as well as copolymerization reactions with two or more different olefinic compounds. For example, in a copolymerization reaction with ethylene, copolymers may include a major amount of ethylene (>50 mole percent) and a minor amount of comonomer <50 mole percent. The comonomers 86 that may be copolymerized with ethylene may have from three to about 20 carbon atoms in their molecular chain.

Olefins that may be used as the monomer 84 or comonomer 86 may include acyclic, cyclic, polycyclic, terminal ($\alpha$), internal, linear, branched, substituted, unsubstituted, functionalized, and non-functionalized olefins. For example, compounds that may be polymerized with the catalysts of the present techniques include propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, or any combination thereof. Further, cyclic and bicyclic olefins, including, for example, cyclopentene, cyclohexene, norbornylene, norbornadiene, and the like, may also be polymerized as described above. In one embodiment, the monomer 84 for the catalyst compositions of the present techniques may be ethylene and the comonomer 86 may be 1-hexene, so that the polymerizations may be copolymerizations of ethylene and 1-hexene. In addition, the catalyst compositions of the present techniques may be used in polymerization of diolefin compounds, including for example, such compounds as 1,3-butadiene, isoprene, 1,4-pentadiene, and 1,5-hexadiene.

The amount of comonomer introduced into a reactor zone to produce a copolymer may be from about 0.001 to about 99 weight percent comonomer based on the total weight of the monomer and comonomer, generally from about 0.01 to about 50 weight percent. In other embodiments, the amount of comonomer introduced into a reactor zone may be from about 0.01 to about 10 weight percent comonomer or from about 0.1 to about 5 weight percent comonomer. Alternatively, an amount sufficient to give the above described concentrations, by weight, of the copolymer produced, may be used.

In certain embodiments, it may be desirable to precontact a mixture formed by contacting the fouling reduction agent 16 and the catalyst 78 and/or cocatalyst 80 (e.g., a first precontacted mixture) with the monomer 84 and/or comonomer 86 (e.g., to form a second precontacted mixture) to enhance the activity and/or productivity of the catalyst composition. The precontacting of the first precontacted mixture with the monomer 84 and/or comonomer 86 may occur in the same precontactor used to contact the fouling reduction agent 16 and the catalyst 78 and/or cocatalyst 80, or may occur in an additional precontactor disposed downstream from the precontactor used to contact the fouling reduction agent 16 and the catalyst 78 and/or cocatalyst 80. In this way, the formation of multiple precontacted mixtures using one or more precontactors is presently contemplated. The precontacting of various components is discussed in further detail below with respect to Section V.

The other components 88 provided to the reactor 60 may include plasticizers (e.g. mineral oil), flow promoters, lubricants, antioxidants, initiators, mold release agents, color enhancers, and/or polymerization aids such as chain transfer agents (e.g., alkyl mercaptans such as n-dodecyl mercaptan, terpenes, alkyl and aryl halides, and alkyl aromatics). Other such additives will be apparent to those of ordinary skill in the art and are within the scope of the present disclosure.

The reactor system 28 may also include various features configured to control the relative amounts of the components of the feedstock 14 provided to the precontactor 18, the loop polymerization reactor 60, or a combination thereof. Further, these features may be used to transfer various feedstocks 14 between storage vessels, treatment vessels, distillation apparatuses, and so forth. By way of example, the illustrated reactor system 28 includes a control system 90 configured to control the relative amounts of the feedstocks 14 provided to the different components of the reactor system 28. The control system 90 may also, in certain embodiments, control the operation of the loop slurry reactor 60 and/or receive information related to the operation of the loop slurry reactor 60. In some configurations, the control system 90 may, based on monitored operating parameters of the loop slurry reactor 60, determine appropriate amounts of the feedstocks 14 and adjust the amounts as appropriate.

Generally, the control system 90 may utilize and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the control system 90. In this way, the control system 90 may be application-specific, or general purpose.

The control system 90 may be a closed loop control system (e.g., does not use feedback for control), an open loop control system (e.g., uses feedback for control), or may include a combination of both open and closed system components and/or algorithms. Further, in some embodiments, the control system 90 may utilize feed forward inputs. For example depending on information relating to the feedstocks 14 (e.g., compositional information relating to the catalyst 78, the cocatalyst 80, the fouling reduction agent 16, the diluent 82, the monomer 84, the comonomer 86, and/or the other feed components 88), the control system 90 may control the flow of any one or a combination of the feedstocks 14 into the precontactor 18 and/or the loop slurry reactor 60.

Any method of controlling the flow of each of the feedstocks 14 to the precontactor 18 and/or through the feed system 24 and/or to the loop slurry reactor 60 is presently contemplated. The illustrated embodiment depicts an example configuration in which the feedstocks 14 are delivered to the precontactor 18, the feed system 24, and the loop slurry reactor 60 via a plurality of flow paths 92 and a plurality of flow control devices 94. The flow paths 92 may include one or more conduits and one or more intermediate flow paths between an origin (e.g., a delivery area from a supplier or an injection port or zone) and a destination (e.g., a storage vessel, a reaction vessel, a treatment vessel, a precontactor, a distillation unit). The flow control devices 94 may include a pump, aspirator, impeller, flow control valve, or any combination thereof.

In the context of the present techniques, the control system 90 may control the flow of the fouling reduction agent 16 to the precontactor 18 along a fouling reduction agent flow path 96 using one or more fouling reduction agent flow control devices 98. The flow of the fouling reduction agent 16 along the fouling reduction agent flow path 96 may be determined based on, among other things, the amount of catalyst 78 and/or cocatalyst 80 in the precontactor 18 and/or being provided to the precontactor 18, the amount of catalyst 78 and/or cocatalyst 80 in the reactor 60 and/or being provided to the reactor 60, indications of a potential fouling condition in the reactor 60, desired polymer product specifications (e.g., desired physical and/or mechanical properties), monitored conditions within the reactor 60 (e.g., monomer and/or comonomer concentrations, temperature, pressure, polymer production rates), or any combination thereof.

Similarly, the control system 90 may control the flow of the catalyst 78 and the cocatalyst 80 to the precontactor 18 along a catalyst flow path 100 and a cocatalyst flow path 102, respectively, using one or more catalyst flow control devices 104 and one or more cocatalyst flow control devices 106, respectively. The flow of the catalyst 78 and the cocatalyst 80 along their respective flow paths may be determined based on, among other things, the amount of fouling reduction agent 16 in the precontactor 18 and/or being provided to the precontactor 18, the amount of fouling reduction agent present within the reactor 60 and/or being provided to the reactor 60, the amount of catalyst 78 and/or cocatalyst 80 in the precontactor 18 and/or being provided to the precontactor 18, the amount of catalyst 78 and/or cocatalyst 80 in the reactor 60 and/or being provided to the reactor 60, indications of a potential fouling condition in the reactor 60, desired polymer product specifications (e.g., desired physical and/or mechanical properties), monitored conditions within the reactor 60 (e.g., monomer and/or comonomer concentrations, temperature, pressure, polymer production rates), or any combination thereof. A flow of the precontacted mixture 22 also may be controlled based on any one or a combination of any flows into the reactor 60 (i.e., into the polymerization zone of the reactor 60) discussed herein, any one or a combination of flows into the precontactor 18, based on various monitored parameters within the reactor 60, or any combination of these and similar variables. For instance, the flow of the precontacted mixture 22 may be controlled along a precontacted mixture flow path 107 using one or more precontacted mixture flow control devices 109.

Amounts of the diluent 82, monomer 84, comonomer 86, and other feed components 88 may be similarly (e.g., individually or together in any combination) controlled along their respective flow paths 108, 110, 112, 114 using one or more respective flow control devices 116, 118, 120, 122. As illustrated, the diluent 82 may be provided to the precontactor 18 along its respective flow path 108 using its respective one or more flow control devices 116, and may also be provided to other parts of the feed system 24 (or distributed throughout the feed system 24) using a separate flow path 124 and one or more associated flow control devices 126. Again, the monomer 84, the comonomer 86, and the other feed components 88 may all be provided to the feed system 24 and, in certain embodiments, may be provided to the precontactor 18 as noted above.

Further, while illustrated as separate from the feed system 24, it should be noted that the flow paths and flow control devices may each be a part of the feed system 24, may control their respective component flows through the feed system 24, and may, in some embodiments, control the flow of the feedstocks 14 into the loop slurry reactor 60. The feed system 24 also may, in some embodiments, combine certain of the feedstocks 14 and may provide these combined feedstocks to the reactor 60 at the first and second feed system inlets 74, 76 via first and second feed system flow paths 128, 130 and using respective one or more flow control devices 132, 134 positioned along the flow paths 128, 130.

Again, the flows of the various feedstocks 14 throughout the reactor system 28 may depend on a number of factors. In addition to being controlled based on the various dynamic processes occurring in the reactor 60, the amounts of the fouling reduction agent 16 and the catalyst 78 and/or cocatalyst 80 may be controlled so as to achieve interaction between these components in specific relative concentrations. In accordance with certain embodiments, the fouling reduction agent 16 and the catalyst 78 and/or cocatalyst 80 may be contacted with one another in specific relative amounts so as to mitigate fouling in accordance with the present technique. In still further embodiments, the fouling reduction agent 16 may be precontacted with the catalyst 78 and/or cocatalyst 80 in an amount such that the fouling reduction agent 16 is present within the precontacted mixture 22 in a certain concentration.

By way of example, the mol ratio of the catalyst 78 to the fouling reduction agent 16 may be between 0.01 mol catalyst 78 to 1.0 mol fouling reduction agent 16 and 1.0 mol catalyst 78 to 0.01 mol fouling reduction agent 16, depending on the particular type of fouling reduction agent 16 employed. For instance, the amount of fouling reduction agent 16 suitable to prevent fouling in the polymerization reaction may be less for certain compounds relative to others, such that the ratio of catalyst 78 to fouling reduction agent 16 may be higher for certain fouling reduction agents 16. Indeed, it is believed that certain of the fouling reduction agents 16 discussed below, such as tetraalkylammonium salts, may display foul-mitigating ability in amounts as low as 1 ppm (based on the weight of the diluent 82) or less. Presented below are examples of the fouling reduction agent 16, the catalyst 78, the cocatalyst 80, and other components that may be used to produce the precontacted mixture 22 (e.g., a catalyst composition) provided to the reactor 60.

III. The Catalyst Composition

As noted above, the precontacted mixture 22 may be referred to as a catalyst composition, at least in part because the precontacted mixture 22 is formed by contacting the catalyst 78 (e.g., a metallocene catalyst) with the fouling reduction agent 16 and, in certain embodiments, other components such as co-catalysts, activators, and so forth. In other words, in some embodiments, a catalyst system (e.g., a catalyst with some or all of its associated activating agents) may be contacted with the fouling reduction agent 16 to produce the catalyst compositions of the present techniques. Discussed hereinbelow are non-limiting examples of what may constitute the different components used to form the catalyst composition.

A. The Fouling Reduction Agent

The fouling reduction agent 16 may be, in a general sense, an ammonium compound. The ammonium compound may be a single type of molecule, a mixture of different types of molecules, or mixtures of components that, when mixed together, may produce transient ammonium compounds. However, as discussed in further detail below, certain ammonium compounds may exhibit surprisingly better effects on the catalyst system compared to other ammonium compounds. Indeed, certain ammonium compounds may exhibit little to no foul-mitigating ability, or may mitigate fouls while also diminishing catalyst activity by an unacceptable amount. The ammonium compound used as the fouling reduction agent 16 may be defined by the general formula:

$$(R^1)(R^2)(R^3)(R^4)N(X^1).$$

In this formula, $X^1$ may be any suitable anion capable of forming an ionic bond with the positively charged nitrogen, including conjugate bases of certain acids. $X^1$ may include, but is not limited to, a halide (fluoride, chloride, bromide, iodide), phosphates, triflates, bisulfates, sulfate, sulfites, fluoroborates, fluorosulfates, trifluoroacetate, fluorophosphates (e.g., hexafluorophosphate), fluorozirconates, fluorosilicates, fluorotitanates, permanganates, substituted or unsubstituted alkanesulfonate, substituted or unsubstituted arenesulfonate, or substituted or unsubstituted alkylsulfate.

$R^1$, $R^2$, $R^3$, and $R^4$ may independently be, generally, carbon-based groups, including aliphatic or aromatic groups. In further embodiments, any one or a combination of $R^1$, $R^2$, $R^3$, and $R^4$ may be joined such that the nitrogen is an atom in a cyclic structure. Aliphatic groups that may be used include, for example, an alkyl group, a cycloalkyl group, an alkenyl group, a cycloalkenyl group, an alkynyl group, an alkadienyl group, a cyclic group, and the like. This may include all substituted, unsubstituted, branched, and linear analogs or derivatives thereof, wherein each group may have from one to 20 carbon atoms. Thus, aliphatic groups may include, for example, hydrocarbyls such as paraffins, alkenyls, and alkynyls. For example, the aliphatic groups may include such groups as methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Aromatic groups that may be used include, for example, phenyl, naphthyl, anthracenyl, and the like. Substituted derivatives of these compounds are also included, wherein each group may have from 4 to about 25 carbons. Such substituted derivatives may include, for example, tolyl, xylyl, mesityl, and the like, including any heteroatom substituted derivatives thereof. Heteroaromatic compounds are also contemplated.

Cyclic groups that may be used as substituents include, for example, cycloparaffins, cycloolefins, cycloacetylenes, arenes such as phenyl, bicyclic groups and the like, as well as substituted derivatives thereof, in each occurrence having from about 3 to about 20 carbon atoms. Thus, substituted heteroatom-substituted cyclic groups such as furanyl may be included herein.

In some specific embodiments, $X^1$ may be a halide, sulfide, hydroxide, or phosphate (e.g., hexafluorophosphate or $PO_3$), and $R^1$, $R^2$, $R^3$, and $R^4$ may be independently selected from a hydrogen, alkyl, branched alkyl, cycloalkyl, aryl, or alkenyl group, wherein the alkyl, branched alkyl, cycloalkyl, aryl, or alkenyl group has from 1 to 20 carbons. In certain of these embodiments, $X^1$ may be a halide, and $R^1$, $R^2$, $R^3$, and $R^4$ may be, independently, an alkyl group, each alkyl group having between 1 and 20 carbons, such that the fouling reduction agent 16 is a tetraalkylammonium halide salt. In accordance with present embodiments, the fouling reduction agent 16 may exhibit enhanced fouling mitigation ability when $X^1$ is a halide (e.g., Cl) and $R^1$, $R^2$, $R^3$, and $R^4$ are each an alkyl group having between 4 and 12 carbons. It should be noted that, in certain of these embodiments, the fouling reduction agent 16 may exhibit enhanced fouling mitigation ability when $R^1$, $R^2$, $R^3$, and $R^4$ are each an alkyl group having between 4 and 12 carbons, each alkyl group being an unsubstituted alkyl chain (i.e., an n-alkyl group, such as n-butyl, n-pentyl, n-hexyl, n-octyl, n-nonyl, n-decyl, n-undecyl, or n-dodecyl, or any combination thereof). Isoalkyls and tertiary alkyls are also within the scope of the present disclosure, where any one or a combination of $R^1$, $R^2$, $R^3$, and $R^4$ are an alkyl group having between 4 and 12 carbons and containing an isoalkyl or tertiary alkyl group. Surprisingly, as discussed in detail below with respect to the examples, the fouling reduction agent 16 exhibits enhanced fouling mitigation ability when the fouling reduction agent 16 is tetra(butyl)ammonium chloride or tetra(dodecyl)ammonium chloride. These specific fouling mitigation agents 16 may also substantially maintain, and in some embodiments, enhance catalyst activity (and/or productivity) compared to the catalyst's baseline activity (and/or productivity), as discussed in detail below.

Other specific examples of the fouling reduction agent 16 include, but are not limited to: ionic liquids, polymeric ammonium compounds, mixtures of various components that may, together, form ammonium compounds, and the like. For example, when the fouling reduction agent 16 is an ionic liquid, the fouling reduction agent 16 may be an imidazolium compound. The fouling reduction agent 16 may also include a mixture of compounds, such as a mixture of acids and amines, which may, in one embodiment, be present as a complex to produce transient ammonium compounds (polymeric ammonium compounds).

Another example of one fouling reduction agent 16 is STADIS 450®, a proprietary antistatic additive mixture available from Octel Starreon of Newark, Del. It is believed that STADIS 450® antistatic additive is a mixture including, among other components, dinonylnaphthylsulfonic acid, a proprietary nitrogen-containing polymer, a proprietary sulfur-containing polymer, 2-propanol, naphthalene, solvent naphtha, and toluene. Other mixtures having nitrogen-containing polymers, acids, solvents, sulfur-containing polymers, and so forth, are also presently contemplated.

While mixtures such as STADIS 450® antistatic additive and other antistatic agents and mixtures may be used as the fouling reduction agent 16, it should be noted that the amounts effective to mitigate fouling may be much less than the amount that would traditionally be used if the STADIS 450® antistatic additive were injected directly into the polymerization reactor. In other words, the introduction of STADIS 450® antistatic additive into the precontactor 18 may enable the mitigation of fouling as a result of water to a greater extent than if the STADIS 450® antistatic additive were provided only to the reactor 60 without any precontacting. For example, as discussed in the Examples, 0.1 mL of 10 wt % STADIS 450® antistatic additive is sufficient to mitigate water-based fouling in a reaction performed in 2 L of isobutane. Based on the weight of the solvent (about 5 kg), this represents less than 5 ppm of STADIS 450® antistatic additive, which is much less than is typically used for the effective mitigation of static-based fouling in a reactor.

Furthermore, it has been found that tetraalkylammonium salts such as n-$Bu_4$NCl and (n-$C_{12}H_{25}$)$_4$NCl may mitigate fouling while also enabling the activity and/or productivity of the catalyst to remain substantially unaffected, while other compositions such as STADIS 450® antistatic additive may diminish the activity and/or productivity of the polymerization catalyst. In other words, the present inventors have found that tetraalkylammonium salts such as n-$Bu_4$NCl and (n-$C_{12}H_{25}$)$_4$NCl may exhibit superior overall performance to other compositions such as STADIS 450® antistatic additive when considering both fouling mitigation and catalyst activity and/or productivity. Indeed, even under the most optimized conditions of precontacting STADIS 450® antistatic additive with the catalyst 78, tetraalkylammonium salts such as n-$Bu_4$NCl and (n-$C_{12}H_{25}$)$_4$NCl were found to exhibit better overall performance in that water-based fouling was mitigated and catalyst activity was also substantially maintained.

It should be appreciated that a careful balance must be struck between fouling mitigation and catalyst activity and/or productivity in that if too much of the fouling reduction agent 16 is used in forming the precontacted mixture 22, fouling may be mitigated while catalyst activity and/or productivity may suffer, while if too little fouling reduction agent 16 is used in forming the precontacted mixture 22, fouling may occur (or may not be mitigated to a sufficient extent). Certain compounds, when used as the fouling reduction agent 16, may not strike this careful balance, regardless of the amount used to form the precontacted mixture 22. Specific amounts of the fouling reduction agent 16 useful for forming the catalyst compositions of the present techniques are discussed in further detail below with respect to Section IV.

B. The Catalyst System

The fouling reduction agent 16, as noted above, may be contacted with the catalyst 78, such as with a catalyst system produced using the catalyst 78, to generate a catalyst composition. The catalyst 78 may be any suitable olefin polymerization catalyst, such as a particle suspended in a fluid medium within the reactor 60. In loop slurry polymerizations, the catalyst 78 begins polymerizing the monomer(s) to produce the polymer, which may collect on the catalyst 78 to form a slurry (e.g., a suspension of the polymer in the diluent 82). In general, Ziegler catalysts, Ziegler-Natta catalysts, metallocenes, and other well-known polyolefin catalyst systems may be used. In accordance with present embodiments, the fouling reduction agent 16 may be particularly well-suited for metallocene catalyst systems, where a metallocene catalyst compound may be used in conjunction with (e.g., contacted with), for example, activator-supports, organometal compounds, or any combination thereof, to form a metallocene catalyst system. Because metallocene catalyst systems are typically considered to be very sensitive to the addition of various components, where certain components can, in some situations, totally diminish catalyst activity and/or productivity or cause a foul, it is believed that the results discussed herein constitute surprising and unexpected results in that, when used appropriately, certain of the fouling reduction agents 16 display the opposite effect.

1. Metallocene Compounds

In certain embodiments, the catalyst 78 may be a metallocene catalyst activated (at least in part), for example, by a solid support. Compounds such as an organoaluminum, an organoaluminoxane, another ionizing compound, or any combination thereof, may also be used for activation in addition or in the alternative (e.g., as a cocatalyst). In certain of these embodiments, the metallocene may be deposited on the solid support, such that the catalyst 78 includes both the metallocene compound and the solid support. The metallocene may be any metallocene suitable to facilitate olefin polymerization, such as an ansa-metallocene (also referred to as a "bridged" metallocene) or an unbridged metallocene. In some embodiments, a catalyst system may employ both an ansa-metallocene and an unbridged metallocene. Numerous processes to prepare metallocene compounds that may be employed in the present techniques have been reported. For example, U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,578, 5,705,579, 6,187,880, 6,509,427, 7,064,225, 7,799,721, and 8,013,177 describe such methods, each of which is incorporated by reference in its entirety herein for all purposes.

The term "bridged" or "ansa-metallocene" may refer to a metallocene compound in which two $\eta^5$-cycloalkadienyl-type ligands in the molecule are linked (e.g., covalently) by a bridging moiety. While any number of atoms may bridge the two $\eta^5$-cycloalkadienyl-type ligands, certain ansa-metallocenes benefit from being "tightly-bridged," meaning that the two $\eta^5$-cycloalkadienyl-type ligands are connected by a bridging group wherein the shortest link of the bridging moiety between the $\eta^5$-cycloalkadienyl-type ligands is a single atom. An unbridged metallocene is therefore intended to denote a metallocene structure in which the two $\eta^5$-cycloalkadienyl-type ligands are not connected by a bridging group.

In embodiments of the present techniques, the metallocenes used to form the precontacted mixture 22 (including the catalyst composition) may be expressed by the general formula:

$$(X^2)(X^3)(X^4)(X^5)M^1.$$

In this formula, $M^1$ may be any transition metal suitable for forming a metallocene compound, including but not limited to titanium, zirconium, or hafnium. $X^2$ may be an $\eta^5$-cyclopentadienyl-type ligand, including but not limited to an unsubstituted or substituted cyclopentadienyl ligand, an unsubstituted or substituted indenyl ligand, or an unsubstituted or substituted fluorenyl ligand. $X^3$ also may be an $\eta^5$-cyclopentadienyl-type ligand, including but not limited to an unsubstituted or substituted cyclopentadienyl ligand, an unsubstituted or substituted indenyl ligand, or an unsubstituted or substituted fluorenyl ligand.

In certain of the embodiments where $X^2$ and $X^3$ are substituted $\eta^5$-cyclopentadienyl-type ligands, one substituent on $X^2$ and $X^3$ may be a bridging group having the formula $ER^5R^6$. E may be a carbon atom, a silicon atom, a germanium atom, or a tin atom, and is bonded to both $X^2$ and $X^3$. $R^5$ and $R^6$ may be independently an alkyl group or an aryl group, either of which may have up to 12 carbon atoms, or may be hydrogen. In further embodiments, $R^5$ and $R^6$ may be hydrocarbyl chains that form a ring, such that respective chain termini of both $R^5$ and $R^6$ are bonded to E. The bridging groups may be selected to influence the activity and/or productivity of the catalyst or the structure of the polymer produced. One or more substituents on $X^2$ and/or $X^3$ may be a substituted or an unsubstituted alkyl or alkenyl group, which may any number of carbon atoms, such as between 1 and 12 carbon atoms.

Generally, substituents $X^4$ and $X^5$ may be independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which may have up to 20 carbon atoms; 4) $OBR^4{}_2$ or $SO_3R^4$, wherein $R^4$ may be an alkyl group or an aryl group, either of which may have up to 12 carbon atoms.

Any additional substituent on the $\eta^5$-cyclopentadienyl-type ligands $X^2$ and $X^3$ and/or on a substituted alkyl group may be independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which may have from 1 to 20 carbon atoms. Alternatively, additional substituents may be present, including halides or hydrogen. The substituents on the $\eta^5$-cyclopentadienyl-type ligands $X^2$ and $X^3$ may be used to control the activity and/or productivity of the catalyst and/or the stereochemistry of the polymer produced (e.g., the tacticity of the polymer). An example of a class of ansa-metallocenes that may be used in accordance with present embodiments is presented below.

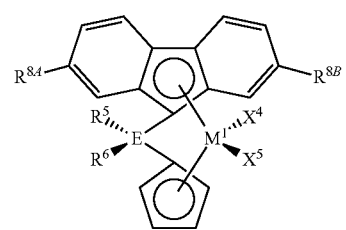

In the above structure, $M^1$ may be zirconium, titanium, or hafnium and $X^5$ and $X^6$ may be independently F, Cl, Br, or I. E may be C or Si and $R^5$ and $R^6$ may be independently an alkyl group, alkenyl group, or an aryl group, either of which may have up to 15 carbon atoms, or $R^5$ and $R^6$ may be hydrogen. Again, the metallocenes used to form the precontacted mixture 22 may have any metallocene structure suitable for forming homopolymers (e.g., ethylene homopolymers) and/or copolymers (e.g., ethylene-hexene copolymers) having desirable physical and mechanical properties.

2. Solid Activator-Supports

As noted above, the metallocenes of the present disclosure may, in certain embodiments, be used in combination with a solid support, such as a solid oxide support. In such embodiments, the catalyst 78 may include both the metallocene and the solid support. However, in certain embodiments, they may be separate in that the solid oxide may not necessarily be a solid support for the metallocene (e.g., the metallocene may or may not be adsorbed onto the solid support). In some embodiments, the solid oxide may be an acidic-activator support that both supports the metallocene component of the catalyst 78 and activates the metallocene molecule for polymerization. The present techniques encompass catalyst compositions that include an acidic activator-support, such as, for example, a chemically-treated solid oxide (CTSO). Additionally or alternatively, the activator-support of the present techniques may include clay minerals having exchangeable cations and layers capable of expanding. These activator supports include ion-exchangeable materials, such as, for example, silicate and aluminosilicate compounds or minerals, either with layered or non-layered structures, and any combination thereof. As discussed below, the CTSO or clay mineral may be used in combination with an organoaluminum cocatalyst to activate the metallocene for polymerization. The activator-support may include a solid oxide treated with an electron-withdrawing anion.

Various processes to prepare solid oxide activator-supports that may be used in the present techniques have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein in its entirety for all purposes.

The activator-support may include the contact product of a solid oxide compound and an electron-withdrawing anion source. The solid oxide compound may include an inorganic oxide, and may be optionally calcined prior to contacting the electron-withdrawing anion source. The contact product may also be calcined either during or after the solid oxide compound is contacted with the electron-withdrawing anion source. In this embodiment, the solid oxide compound may be calcined or uncalcined. In another embodiment, the activator-support may include the contact product of a calcined solid oxide compound and an electron-withdrawing anion source.

The activator-support may include a solid inorganic oxide material, a mixed oxide material, or a combination of inorganic oxide materials that may be chemically-treated with an electron-withdrawing component, and optionally treated with another metal ion. Thus, the solid oxide of the present techniques encompasses oxide materials such as alumina, "mixed oxide" compounds such as silica-alumina or silica-zirconia or silica-titania, and combinations and mixtures thereof. The mixed metal oxide compounds such as silica-alumina, with more than one metal combined with oxygen to form a solid oxide compound, may be made by co-gellation, impregnation or chemical deposition, and are encompassed by the present techniques.

Further, the activator-support may include an additional metal or metal ion such as zinc, nickel, vanadium, silver, copper, gallium, tin, tungsten, molybdenum, or any combination thereof. Examples of activator-supports that further include a metal or metal ion include, for example, zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

The activator-support of the present techniques may include a solid oxide of relatively high porosity, which exhibits Lewis acidic or Brønsted acidic behavior. The solid oxide may be chemically-treated with an electron-withdrawing component, typically an electron-withdrawing anion, to form an activator-support. While not intending to be bound by theory, it is believed that treatment of the inorganic oxide with an electron-withdrawing component augments or enhances the acidity of the oxide. Thus, the activator-support exhibits Lewis or Brønsted acidity which may be typically greater than the Lewis or Brønsted acidity of the untreated solid oxide. The polymerization activity of the chemically-treated solid oxide may be enhanced over the activity shown by an untreated solid oxide.

Suitable solid oxide materials or compounds that may be used in the chemically-treated solid oxide of the present techniques may include, for example, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Mixed oxides that may be used in the activator-support of the present techniques may include, for example, mixed oxides of any combination of Al, B, Be, Bi, Cd, Co, Cr, Cu, Fe, Ga, La, Mn, Mo, Ni, P, Sb, Si, Sn, Sr, Th, Ti, V, W, Y, Zn, Zr, and the like. Examples of mixed oxides that may be used in the activator-support of the present techniques may also include silica-alumina, silica-titania, silica-zirconia, zeolites, many clay minerals, pillared clays, alumina-titania, alumina-zirconia, aluminophosphate, and the like.

The electron-withdrawing component used to treat the oxide may be any component that increases the Lewis or Brønsted acidity of the solid oxide upon treatment. In one embodiment, the electron-withdrawing component is typically an electron-withdrawing anion derived from a salt, an acid, or other compound such as a volatile organic compound that can serve as a source or precursor for that anion. Examples of electron-withdrawing anions include, for example, fluoride, chloride, bromide, iodide, phosphate, trifluoromethane sulfonate (triflate), bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, substituted or unsubstituted alkylsulfate, and the like, including any mixtures and combinations thereof. In addition, other ionic or non-ionic compounds that serve as sources for these electron-withdrawing anions may also be used in the present techniques. In certain embodiments, the chemically-treated solid oxide may be a sulfated solid oxide, such as a sulfated silica or a sulfated alumina.

3. Organoaluminum Compounds

As noted above, the metallocene catalyst systems of the present embodiments may include the metallocene, a solid oxide activator-support, and, in some embodiments, an organoaluminum compound. The organoaluminum compound may be omitted when it is not needed to impart catalytic activity to the catalyst composition. In certain embodiments, the organoaluminum compound may be considered to be the cocatalyst 80.

Organoaluminum compounds that may be used in the catalyst systems include, for example, compounds with the formula:

$$Al(X^7)_n(X^8)_{3-n},$$

wherein $X^7$ may be a hydrocarbyl having from 1 to about 20 carbon atoms; $X^8$ may be alkoxide or aryloxide, any of which having from 1 to about 20 carbon atoms, halide, or hydride; and n may be a number from 1 to 3, inclusive. In various embodiments, $X^7$ may be an alkyl having from 1 to about 10 carbon atoms. Moieties used for $X^7$ may include, for example, methyl, ethyl, propyl, butyl, sec-butyl, isobutyl, 1-hexyl, 2-hexyl, 3-hexyl, isohexyl, heptyl, or octyl, and the like. In other embodiments, $X^8$ may be independently fluoride, chloride, bromide, methoxide, ethoxide, or hydride. In yet another embodiment, $X^8$ may be chloride.

In the formula $Al(X^7)_n(X^8)_{3-n}$, n may be a number from 1 to 3 inclusive, and in an exemplary embodiment, n is 3. The value of n is not restricted to an integer, therefore this formula may include sesquihalide compounds, other organoaluminum cluster compounds, and the like.

Generally, organoaluminum compounds that may be used in the catalyst systems may include trialkylaluminum compounds, dialkylaluminium halide compounds, dialkylaluminum alkoxide compounds, dialkylaluminum hydride compounds, and combinations thereof. Examples of such organoaluminum compounds include trimethylaluminum, triethylaluminum (TEA), tripropylaluminum, tributylaluminum, tri-n-butylaluminum (TNBA), triisobutylaluminum (TIBA), trihexylaluminum, triisohexylaluminum, trioctylaluminum, diethylaluminum ethoxide, diisobutylaluminum hydride, or diethylaluminum chloride, or any combination thereof. If the particular alkyl isomer is not specified, the compound may encompass all isomers that can arise from a particular specified alkyl group.

As noted above, in certain embodiments, the metallocene catalyst system may include or be used in conjunction with aluminoxane, borate compounds, $MgCl_2$, or any combination thereof. In particular, compounds such as aluminoxanes, organoboron compounds, ionizing ionic compounds, or any combination thereof, may be used as the cocatalyst 80 with the catalyst 78, either in the presence or absence of the activator support discussed above. Additionally, such cocatalysts may be used with the metallocene, either in the presence or absence of an organoaluminum compound. Thus, the organoaluminum cocatalyst compound discussed above may be optional, for instance when a ligand on the metallocene is a hydrocarbyl group, H, or $BH_4$; when the activator includes an organoaluminoxane compound; or when both these conditions are present. However, the catalyst compositions of the present techniques may be active in the substantial absence of cocatalysts such as aluminoxanes, organoboron compounds, ionizing ionic compounds, or any combination thereof. It is also within the scope of the current techniques to use an aluminoxane in combination with a trialkylaluminum, such as disclosed in U.S. Pat. No. 4,794,096, which is herein incorporated by reference in its entirety for all purposes.

4. Organoaluminoxane Compounds

By way of example, the catalyst composition may not require an acidic activator-support such as a chemically-treated solid oxide to weaken the bonds between the metal and the $X^4$ or $X^5$ ligands, as the organoaluminoxane may perform this function, or may replace the $X^4$ or $X^5$ ligands with more active species. The catalyst composition may also not require an organoaluminum compound. Thus, any metallocene compounds presented herein may be combined with any of the aluminoxanes presented herein, or any combination of aluminoxanes presented herein, to form catalyst compositions of the present techniques. The organoaluminoxanes described herein may be considered to be a cocatalyst. Further, any metallocene compounds presented herein may be combined with any aluminoxane or combination of aluminoxanes, and an activator-support such as, for example, a layered mineral, an ion-exchangeable activator-support, an organoboron compound or an organoborate compound, to form a catalyst composition of the present techniques.

Aluminoxanes may be referred to as poly(hydrocarbyl aluminum oxides) or organoaluminoxanes. The other catalyst components may be contacted with the aluminoxane in a saturated hydrocarbon compound solvent, though any solvent which is substantially inert to the reactants, intermediates, and products of the activation step may be used. The catalyst composition formed in this manner may be collected by any method including, but not limited to filtration, or the catalyst composition may be introduced into the polymerization reactor without being isolated.

The aluminoxane compound of the present techniques may be an oligomeric aluminum compound, wherein the aluminoxane compound may include linear structures, cyclic, or cage structures, or mixtures of all three. Cyclic aluminoxane compounds having the formula:

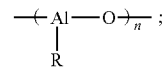

wherein
R may be a linear or branched alkyl having from 1 to 10 carbon atoms, and n may be an integer from 3 to about 10 may be encompassed by the present techniques. The $(AlRO)_n$ moiety shown here also constitutes the repeating unit in a linear aluminoxane. Thus, linear aluminoxanes having the formula:

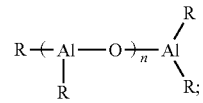

wherein
R may be a linear or branched alkyl having from 1 to 10 carbon atoms, and n may be an integer from 1 to about 50, are also encompassed by the present techniques.

Further, useful aluminoxanes may also have cage structures of the formula $R^t_{5m+\alpha}R^b_{m-\alpha}Al_{4m}O_{3m}$, wherein m may be 3 or 4 and $\alpha$ is equal to $n_{Al(3)} - n_{O(2)} + n_{O(4)}$. In this structure $n_{Al(3)}$ is the number of three coordinate aluminum atoms, $n_{O(2)}$ is the number of two coordinate oxygen atoms, and $n_{O(4)}$ is the number of 4 coordinate oxygen atoms. $R^t$ represents a terminal alkyl group and $R^b$ represents a bridging alkyl group, either of which may have from 1 to 10 carbon atoms.

Thus, aluminoxanes may be represented generally by formulas such as $(R-Al-O)_n$, $R(R-Al-O)_nAlR_2$, and the like, wherein the R group may be a linear or branched $C_1$-$C_6$ alkyl such as methyl, ethyl, propyl, butyl, pentyl, or hexyl, and n may represent an integer from 1 to about 50. The aluminoxane compounds of the present techniques may include, for example, methylaluminoxane (MAO), ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present techniques, methyl aluminoxane (MAO), ethyl aluminoxane, or isobutyl aluminoxane may also be used as cocatalysts in the compositions of the present techniques. These aluminoxanes may be prepared from trimethylaluminum, triethylaluminum, or triisobutylaluminum, respectively, and may be referred to as poly(methyl aluminum oxide), poly(ethyl aluminum oxide), and poly (isobutyl aluminum oxide), respectively. The present techniques encompass many values of n in the aluminoxane formulas $(R—Al—O)_n$ and $R(R—Al—O)_n AlR_2$. In exemplary aluminoxanes, n may be at least about 3. However, depending upon how the organoaluminoxane may be prepared, stored, and used, the value of n may be variable within a single sample of aluminoxane, and such combinations of organoaluminoxanes are encompassed by the methods and compositions of the present techniques.

Organoaluminoxanes may be prepared by various procedures which are available. Examples of organoaluminoxane preparations are disclosed in U.S. Pat. Nos. 3,242,099 and 4,808,561, each of which is incorporated by reference herein in its entirety for all purposes. One example of how an aluminoxane may be prepared is as follows. Water may be dissolved in an inert organic solvent and then reacted with an aluminum alkyl compound such as $AlR_3$ to form the desired organoaluminoxane compound. While not intending to be bound by this statement, it is believed that this synthetic method can afford a mixture of both linear and cyclic $(R—Al—O)_n$ aluminoxane species, both of which are encompassed by the present techniques. Alternatively, organoaluminoxanes may be prepared by reacting an aluminum alkyl compound such as $AlR_3$ with a hydrated salt, such as hydrated copper sulfate, in an inert organic solvent.

5. Organoboron Compounds

The present disclosure is also intended to encompass catalyst compositions that use organoboron or organoborate compounds. Any metallocene compound presented herein may be combined with any of the organoboron or organoborate cocatalysts presented herein, or any combination of organoboron or organoborate cocatalysts presented herein. This composition may include a component that provides an activatable ligand such as an alkyl or hydride ligand to the metallocene, when the metallocene compound does not already include such a ligand, such as an organoaluminum compound. Further, any metallocene compounds presented herein may be combined with: any an organoboron or organoborate cocatalyst; an organoaluminum compound; optionally, an aluminoxane; and optionally, an activator-support; to form a catalyst composition of the present techniques.

The term "organoboron" compound may be used to refer to neutral boron compounds, borate salts, or combinations thereof. For example, the organoboron compounds in various embodiments may be a fluoroorgano boron compound, a fluoroorgano borate compound, or a combination thereof. Any fluoroorgano boron or fluoroorgano borate compound may be utilized. The term fluoroorgano boron has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds may be referred to collectively by organoboron compounds, or by either name as the context requires.

Fluoroorgano borate compounds that may be used as cocatalysts in the present techniques include, for example, fluorinated aryl borates such as, N,N-dimethylanilinium tetrakis(pentafluorophenyl)borate, triphenylcarbenium tetrakis (pentafluorophenyl)borate, lithium tetrakis(pentafluorophenyl)borate, N,N-dimethylanilinium tetrakis[3,5-bis (trifluoro-methyl)phenyl]borate, triphenylcarbenium tetrakis [3,5-bis(trifluoromethyl)phenyl]borate, and the like, including mixtures thereof. Examples of fluoroorgano boron compounds that may be used as cocatalysts in the present techniques include, for example, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919, 983, which is herein incorporated by reference in its entirety herein.

6. Ionizing Ionic Compounds

Embodiments of the present techniques may include a catalyst composition as presented herein, including an optional ionizing ionic compound in addition to other components. Examples of ionizing ionic compounds are disclosed in U.S. Pat. Nos. 5,576,259 and 5,807,938 which are herein incorporated by reference in their entirety for all purposes.

An ionizing ionic compound is an ionic compound which can function to enhance activity and/or productivity of the catalyst composition. While not intending to be bound by theory, it is believed that the ionizing ionic compound may be capable of reacting with the metallocene compound and converting the metallocene into a cationic metallocene compound. Again, while not intending to be bound by theory, it is believed that the ionizing ionic compound can function as an ionizing compound by completely or partially extracting an anionic ligand, possibly a non-$\eta^5$-alkadienyl ligand, such as $X^3$ or $X^4$, from the metallocene. However, the ionizing ionic compound is an activator regardless of whether it is ionizes the metallocene, abstracts an $X^4$ or $X^5$ ligand in a fashion as to form an ion pair, weakens the metal-$(X^4)$ or metal-$(X^5)$ bond in the metallocene, simply coordinates to an $X^4$ or $X^5$ ligand, or follows any other mechanisms by which activation can occur. Further, it is not necessary that the ionizing ionic compound activate the metallocene only. The activation function of the ionizing ionic compound may be evident in the enhanced activity and/or productivity of catalyst composition as a whole, as compared to a catalyst composition containing catalyst composition that does not include any ionizing ionic compound.

Examples of ionizing ionic compounds may include, for example, such compounds as: tri(n-butyl)ammonium tetrakis (p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl) borate, tri(n-butyl)ammonium tetrakis[3,5-bis (trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetrakis (phenyl)borate, lithium tetrakis(p-tolyl)borate, lithium tetrakis(m-tolyl)borate, lithium tetrakis(2,4-dimethylphenyl) borate, lithium tetrakis(3,5-dimethylphenyl)borate, lithium tetrafluoroborate, sodium tetrakis(pentafluorophenyl)borate, sodium tetrakis(phenyl)borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis (pentafluorophenyl)borate, potassium tetrakis(phenyl) borate, potassium tetrakis(p-tolyl)borate, potassium tetrakis (m-tolyl)borate, potassium tetrakis(2,4-dimethylphenyl) borate, potassium tetrakis(3,5-dimethylphenyl)borate, potassium tetrafluoroborate, triphenylcarbenium tetrakis(p-tolyl)aluminate, triphenylcarbenium tetrakis(m-tolyl)-aluminate, triphenylcarbenium tetrakis(2,4-dimethylphenyl)aluminate, triphenylcarbenium tetrakis(3,5-dimethylphenyl) aluminate, triphenylcarbenium tetrakis(pentafluorophenyl) aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl) aluminate, tropylium tetrakis(pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl) aluminate, lithium tetrafluoroaluminate, sodium tetrakis (pentafluorophenyl)aluminate, sodium tetrakis(phenyl) aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl) aluminate, sodium tetrafluoroaluminate, potassium tetrakis (pentafluorophenyl)aluminate, potassium tetrakis(phenyl) aluminate, potassium tetrakis(p-tolyl)aluminate, potassium tetrakis(m-tolyl)-aluminate, potassium tetrakis(2,4-dimethylphenyl)aluminate, potassium tetrakis(3,5-dimethylphenyl) aluminate, potassium tetrafluoroaluminate, triphenylcarbenium tris(2,2',2"-nonafluorobiphenyl)fluoroaluminate, silver tetrakis(1,1,1,3,3,3-hexafluoroisopropanolato)aluminate, or silver tetrakis(perfluoro-t-butoxy)aluminate, or any combination thereof.

As noted above, a precontacted mixture of the fouling reduction agent 16 and the catalyst 78 (and any cocatalyst 80) may be produced before the monomer 84 and/or comonomer 86 are allowed to interact with the catalyst composition (e.g., in a reaction/polymerization zone). In this way, the monomer 84 and/or comonomer 86 may be contacted with the precontacted mixture of the fouling reduction agent 16 and the catalyst 78 (and any cocatalyst 80) before introduction into the reactor 60 (e.g., in a precontactor), after the catalyst composition is introduced into the reactor 60, or any combination thereof. Again, in certain embodiments, precontacting the monomer 84 and/or comonomer 86 with the precontacted mixture of the fouling reduction agent 16 and the catalyst 78 (and any cocatalyst 80) may enable enhanced catalyst activity and/or productivity.

7. Example Catalyst Compositions

In accordance with present embodiments, as noted above, precontacting the fouling reduction agent 16, the catalyst 78, and, in some embodiments, one or more cocatalysts and/or activators may produce a catalyst composition that is better able to tolerate the presence of water compared to a catalyst composition that does not include the fouling reduction agent 16. By way of specific example, in some embodiments, a catalyst composition includes a contact product of contact components including a metallocene, an agent including an ammonium salt (e.g., a tetraalkylammonium salt, an ionic liquid, a polymer having the ammonium salt, or any combination thereof), an organoaluminum and/or organoaluminoxane, and a solid oxide activator-support. In certain of these embodiments, the catalyst composition includes the contact product of contact components including a metallocene catalyst, a tetraalkylammonium salt, an organoaluminum, and a chemically treated solid oxide activator-support (e.g., an SSA). In further embodiments, the catalyst composition includes the contact product of contact components including a metallocene catalyst, a tetraalkylammonium halide salt, a trialkylaluminum and/or MAO, and a chemically treated solid oxide activator-support.

In still further embodiments, the catalyst composition includes the contact product of contact components including an ansa-metallocene catalyst, a tetra(n-butyl)ammonium halide salt and/or a tetra(n-dodecyl)ammonium halide salt, a trialkylaluminum and/or MAO, and a fluorided or sulfated solid oxide activator-support. In some embodiments of the catalyst compositions above, the contact components are substantially free of monomers, such as α-olefins. In other embodiments, the contact components further include α-olefins such as ethylene, 1-hexene, or a combination thereof.

IV. Preparation of the Catalyst Composition

The present disclosure encompasses a catalyst composition (e.g., the precontacted mixture 22) prepared by a method that includes contacting the olefin polymerization catalyst 78 and the fouling reduction agent 16, as presented herein. The method presented herein encompasses any series of contacting steps that allows the catalyst 78 or a catalyst system formed using the catalyst 78 to be contacted with the fouling reduction agent 16, including any order of contacting the fouling reduction agent 16 with any components used to generate the catalyst system. While not intending to be limiting, examples of contacting steps may be exemplified using a metallocene, a treated solid oxide activator-support, and an organoaluminum, and contacting these components with the fouling reduction agent 16. These steps may encompass any number of precontacting and postcontacting steps, and may further encompass using the monomer 84 and/or the comonomer 86 as a contact component at certain steps before or after the fouling reduction agent 16 is present. Examples of methods to prepare the catalyst composition of the present disclosure are discussed below.

Figure 3:
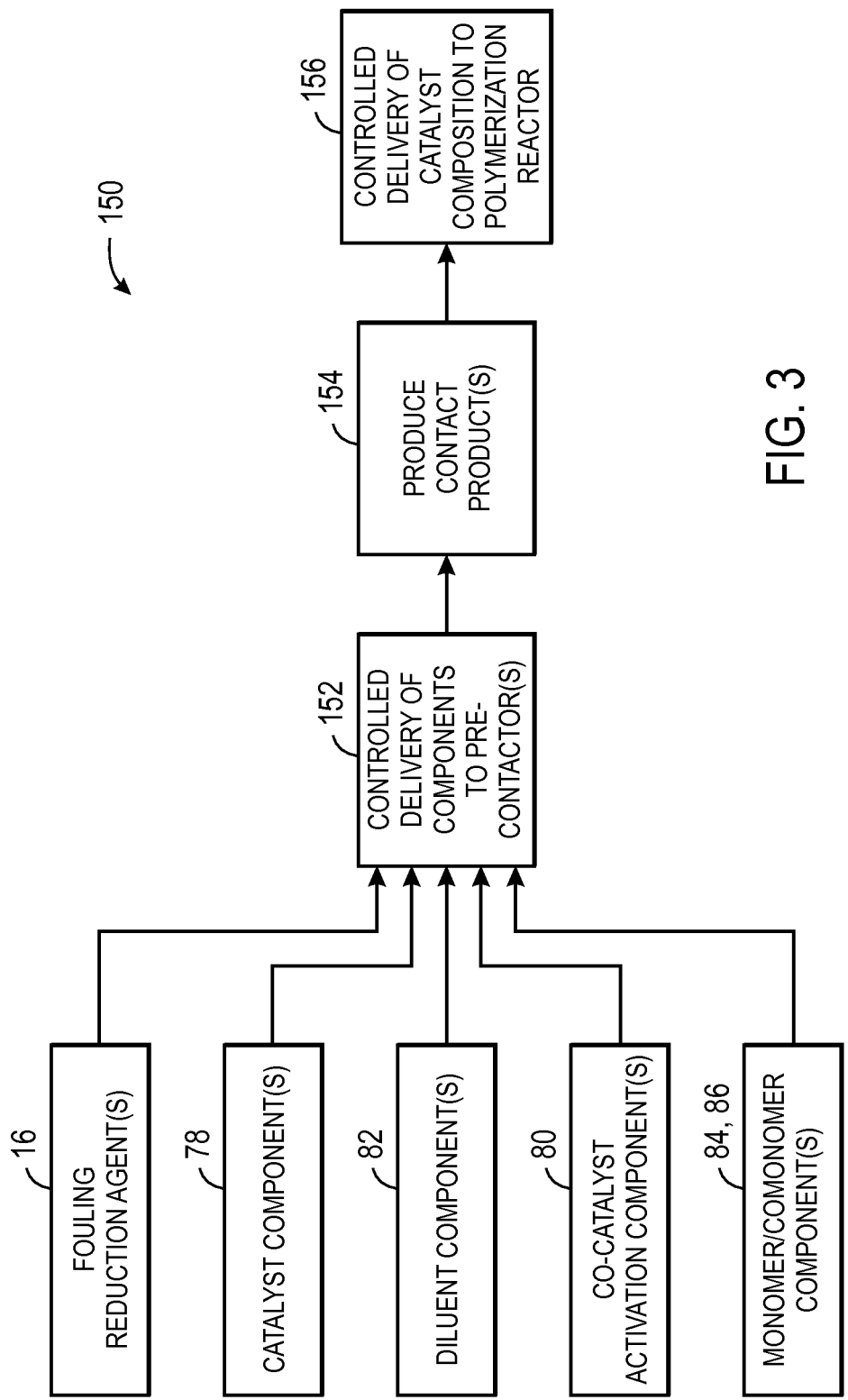
FIG. 3 is a schematic diagram of a process for producing a catalyst composition in one or more precontactors, and introducing the catalyst composition into a polymerization reactor, in accordance with an embodiment of the present techniques.

FIG. 3 illustrates an example scheme 150 for producing catalyst compositions in accordance with the present disclosure. By way of example, the scheme 150 may be performed by the control system 90 in combination with the various flow control features depicted in FIG. 2. However, in some embodiments, a human operator may perform certain of these tasks, either alone or in combination with the control system 90. However, embodiments in which the entire scheme 150 is automated are presently contemplated.

As set forth above, the present disclosure encompasses forming catalyst compositions by contacting the fouling reduction agent 16 with the catalyst 78 or a catalyst system incorporating the catalyst 78. As depicted in FIG. 3, a number of components may be provided to one or more precontactors in order to produce the catalyst composition, including the fouling reduction agent 16 (which can include multiple agents), the catalyst 78, the diluent 82, the cocatalyst(s)/activator(s) 80 (which may include multiple components that may be individually considered to be activators or cocatalysts), and, in some situations, the monomer 84 and/or comonomer 86.

The scheme 150 includes the controlled delivery (block 152) of any one or a combination of these components to one or more precontactors at specific times, which causes one or more contact products to be produced (block 154). For example, multiple contact products may be formed by precontacting a first set of components followed by precontacting the first set with a second set of components. Once formed, the contact products may produce a catalyst composition, which may be controllably delivered (block 156) to a polymerization reactor as generally discussed above.

A. Precontacting the Catalyst and Fouling Reduction Agent

As discussed above, the fouling reduction agent 16 and the catalyst 78 or a catalyst system produced using the catalyst 78, may enhance the tolerance of the catalyst system to various undesirable components, such as water. The fouling reduction agent 16 may, for example, be precontacted with the catalyst 78 before or after the catalyst 78 has been activated or contacted with a cocatalyst. In other embodiments, the precontacting of the catalyst 78 and the fouling reduction agent 16 may be performed as the catalyst 78 is being activated or has otherwise contacted a cocatalyst. Precontacting in accordance with present embodiments may be carried out in any suitable equipment, such as tanks, stirred mix tanks, various static mixing devices, a tube, a flask, a vessel of any type, or the polymerization reactor before polymerization conditions are initiated, or any combination thereof. Indeed, any order of precontacting of any of the components noted above is presently contemplated.

Generally, the fouling reduction agent 16 may be precontacted with the catalyst (e.g., the metallocene compound), or any other precontacted mixture having the catalyst, for any appropriate amount of time. The appropriate amount of time for precontacting may be determined based on polymerization scale, precontact conditions (e.g., temperature, pressure), catalyst requirements (e.g., throughput), polymerization conditions, and the particular components used. By way of example, the precontact time between the fouling reduction agent 16 and the metallocene may be on the order of seconds, such as between 1 second and 50 seconds, between 1 second and 30 seconds, or between 5 seconds and 20 seconds. Alternatively, the precontact time between the fouling reduction agent 16 and the metallocene may be on the order of minutes, such as between 1 minute and 50 minutes, between 1 minute and 30 minutes, between 1 minute and 15 minutes, or between 1 minute and 5 minutes. Precontact times greater than 1 hour are also presently contemplated, such as precontact times of between 1 hour and 24 hours.

In some embodiments, a metallocene catalyst (which may or may not have been precontacted with an activator-support) may be first contacted with an organoaluminum for a first period of time. The first period of time for contact, the first precontact time, between the metallocene and the organoaluminum may be any appropriate contacting time, such as a range in time from about 1 second to about 24 hours, from about 0.1 to about 1 hour, or from about 10 minutes to about 30 minutes. In some embodiments, a monomer, not necessarily the monomer to be polymerized, may be added for additional activation of the catalyst. After the organoaluminum and the metallocene have been precontacted for the first period of time, a first contact product may be produced. The first contact product may then be contacted with the fouling reduction agent 16 (e.g., a tetraalkylammonium salt) for a second period of time, a second contact time, to produce a second contact product. The second contact time may be any appropriate contact time, such as from about 1 second to about 24 hours, between 1 second and 50 seconds, between 1 second and 30 seconds, or between 5 seconds and 20 seconds, alternatively between 1 minute and 50 minutes, between 1 minute and 30 minutes, between 1 minute and 15 minutes, or between 1 minute and 5 minutes, alternatively between 1 hour and 24 hours.

In some embodiments (e.g., when the metallocene has not yet contacted a solid oxide), the second contact product may be contacted with a solid oxide activator-support. The resulting composition may be, in some embodiments, termed a postcontacted mixture. The postcontacted mixture may be allowed to remain in contact for a third period of time, the postcontact time, prior to being used in the polymerization process. Postcontact times between the solid oxide activator-support and the second precontacted mixture may range in time from about 1 minute to about 24 hours, from 0.1 hours to about 1 hour, or from about 10 minutes to about 30 minutes.

Further processing may be performed to adsorb one or more of the catalyst composition components onto the solid oxide. However, such adsorption is not required. For example, the postcontacted mixture may be heated at a temperature and for a time sufficient to allow adsorption, impregnation, or interaction of precontacted mixture and the solid oxide activator-support, such that a portion of the components of the precontacted mixture may be immobilized, adsorbed, or deposited thereon. For example, the postcontacted mixture may be heated from between about 0° F. to about 150° F. (about −18° C. to about 66° C.), or from between about 40° F. to about 95° F. (about 7° C. to about 35° C.).

The various catalyst components (for example, metallocene, activator-support, organoaluminum, and tetraalkylammonium salt) may be precontacted in any order, and not necessarily the order noted above. The precontacting of these components may be a continuous process, in which the precontacted product (e.g., the precontacted mixture 22) may be fed continuously to the reactor (e.g., loop slurry reactor 60), or may be performed in a stepwise or batchwise process in which one or more batches of precontacted product(s) may be used to make a catalyst composition. Batches of the catalyst composition may be added to the reactor once or at various intervals.

The overall precontacting process may be carried out over a time period that may range from a few seconds to as much as several days, or longer. For example, the continuous precontacting process may last from about 1 second to about 1 hour, from about 10 seconds to about 45 minutes, or from about 1 minute to about 30 minutes.

B. Multiple Precontacting Steps

The precontacting process may be carried out in multiple steps in which multiple mixtures are prepared, each including a different set of catalyst composition components. For example, at least two catalyst composition components (e.g., the metallocene and the organoaluminum) may be contacted forming a first mixture, followed by contacting the first mixture with another catalyst composition component (e.g., the fouling reduction agent 16) forming a second mixture, and so forth. For example, a first mixture of two catalyst components may be formed in a first vessel, a second mixture including the first mixture plus one additional catalyst composition component may be formed in the first vessel or in a second vessel, which may be placed downstream of the first vessel. As another example, the fouling reduction agent 16 may be first contacted with a cocatalyst (e.g., organoaluminum, organoaluminoxane) and/or an activator (e.g., solid oxide activator-support) to form a first mixture. This first mixture may then be added to a second mixture that includes the metallocene.

In this way, one or more of the catalyst composition components may be split and used in different precontacting treatments. For example, part of a catalyst composition component may be fed into a first precontacting vessel for precontacting with another catalyst composition component, while the remainder of that same catalyst composition component may be fed into a second precontacting vessel for precontacting with another catalyst composition component, or may be fed directly into the reactor, or a combination thereof. By way of non-limiting example, a catalyst composition of the present techniques may be prepared by contacting 1-hexene, an ansa-metallocene, and a sulfated alumina activator for a first contact time to produce a first contacted mixture, contacting triisobutylaluminum with tetra(n-butyl) ammonium chloride or tetra(n-dodecyl)ammonium chloride for at a second contact time to produce a second contacted mixture, followed by contacting the second contacted mixture with the first contacted mixture for at least about 1 second up to about one hour to form the active catalyst composition. Example contact times are discussed in further detail below.

While the catalyst compositions produced in accordance with present embodiments may benefit from precontacting the fouling reduction agent 16 with the catalyst 78 before introducing the catalyst composition into the reactor, in some embodiments, neither a precontacting step nor a postcontacting step may be required for the present techniques. For instance, the fouling reduction agent 16 and other catalyst composition components (e.g., those depicted in FIG. 3) may be injected as separate streams into the reactor, albeit in sufficient proximity so as to ensure appropriate contacting within the polymerization reactor before substantial polymerization by the catalyst has occurred. In one embodiment, the fouling reduction agent 16, and in particular a tetraalkylammonium salt, may be added at any time to the reactor, regardless of the introduction time of the catalyst system into the reactor and regardless of whether the catalyst system has begun the polymerization process.

C. Component Ratios for Catalyst Composition

In embodiments of the present techniques, the molar ratio of the fouling reduction agent 16 to the catalyst 78 (e.g., metallocene) compound may be from about 1:1 to about 1:10,000 (e.g., about 1:2, 1:5, 1:20, 1:50, 1:200, 1:500, 1:2000, 1:5000, 1:8000, etc.), from about 1:1 to about 1:1,000, or from about 1:1 to about 1:100. These molar ratios reflect the ratio of the fouling reduction agent 16 to metal in the catalyst 78 (e.g., the metal of the metallocene compound) in the catalyst composition (e.g., the precontacted mixture 22). Alternatively represented and in further embodiments, the mol ratio of the fouling reduction agent 16 to the metallocene compound may be between 0.01 to 1 and 1:1, between 0.02 to 1 and 0.2 to 1, between 0.05 to 1 and 0.5 to 1, or between 0.1 to 1 and 0.8 to 1. It should be noted that in certain circumstances, such as in continuous processes, the mol ratio of the fouling reduction agent 16 to the metallocene compound may be maintained based on their relative amounts in the precontactor, or based on their relative amounts in the reactor, or both. By way of specific example, in one non-limiting embodiment, an approximate ratio of between 0.1 and 0.2 mol tetra(n-dodecyl)ammonium chloride (e.g., between approximately 0.10 mol and 0.15 mol) to 1 mol metallocene may be sufficient, and an approximate ratio of between 0.1 and 0.2 mol tetra(n-butyl)ammonium chloride (e.g., between approximately 0.14 and 0.18 mol) to 1 mol metallocene may be sufficient to mitigate fouling while also enabling a substantial maintenance of catalyst activity.

Excess fouling reduction agent 16 to catalyst is also presently contemplated, although higher catalyst activity and/or productivity/productivity may be obtained at molar ratios of less than 1:1 fouling reduction agent 16 to catalyst 78. Thus, as an alternative, the molar ratio of the catalyst 78 (e.g., metallocene) compound to the fouling reduction agent 16 may be from about 1:1 to about 1:10,000 (e.g., about 1:2, 1:5, 1:20, 1:50, 1:200, 1:500, 1:2000, 1:5000, 1:8000, etc.), from about 1:1 to about 1:1,000, or from about 1:1 to about 1:100. As above, these molar ratios reflect the ratio of metal in the catalyst 78 (e.g., the metal of the metallocene compound) to the fouling reduction agent 16 in the catalyst composition (e.g., the precontacted mixture 22).

In embodiments of the present techniques, the molar ratio of the catalyst 78 (e.g., metallocene compound) to the cocatalyst 80 (e.g., organoaluminum compound, and/or organoaluminoxane compound, and/or organoboron compound, and/or ionizing compound) may be any suitable ratio. Typical ranges are from about 1:1 to about 1:10,000 (e.g., about 1:2, 1:5, 1:20, 1:50, 1:200, 1:500, 1:2000, 1:5000, 1:8000, etc.), from about 1:1 to about 1:1,000, or from about 1:1 to about 1:100. These molar ratios reflect the ratio of metal in the catalyst 78 (e.g., the metal of the metallocene compound) to the total amount of organoaluminum and/or organoaluminoxane compound in all mixtures, such as in the catalyst composition. The weight ratio of the catalyst 78 (e.g., metallocene compound) to solid oxide activator-support may also be any suitable amount. Typical molar ratios are from about 1:1 to about 1:1,000,000 (e.g., 1:2, 1:10, 1:5,000, 1:100,000, etc.), from about 1:10 to about 1:100,000, or from about 1:20 to about 1:1000 in the catalyst composition. In embodiments where the catalyst 78 is precontacted with a monomer, the molar ratio of monomer to metallocene compound in the precontacted mixture may be from about 1:10 to about 100,000:1 (e.g., 1:10, 1:5, 1:1, 5:1, 5000:1, 10,000:1, 50,000:1, etc.), or from about 10:1 to about 1,000:1.

V. Properties of the Catalyst Composition in Polymerization Reactions

As noted above, the catalyst compositions formed by contacting a catalyst and fouling reduction agent in accordance with the present technique may be used in any polymerization reaction, including homopolymerizations and copolymerizations, such as ethylene homopolymerizations and ethylene/hexene copolymerizations. The catalyst composition may be provided to the polymerization reactor continuously, periodically in batches, or only once.

A. Determining Fouling Mitigation and Relative Catalyst Activity and/or Productivity There may be a number of ways to determine whether a particular material (e.g., a particular ammonium compound) may mitigate fouling (e.g., due to the presence of water), and the extent to which it is able to mitigate such fouling. For instance, in non-continuous polymerization runs, fouling mitigation can be qualitatively determined by observing whether a particular polymerization process in which the particular component is employed results in fouling. In this case, the fouling can be identified by observing whether there is a buildup of solid polymer on reactor walls or other features of a reactor (e.g., impellers or other mixing devices). The amount of polymer buildup may, in some embodiments, be used to determine the relative fouling mitigation ability between different components or different catalyst compositions, such that a first fouling reduction agent may have better fouling mitigation ability compared to a second fouling reduction agent when the polymerization run in which the first fouling reduction agent is employed results in less polymer buildup than a process in which the second fouling reduction agent is employed.

In both non-continuous and continuous polymerization runs, fouling mitigation can also be qualitatively and, in certain embodiments, quantitatively determined based on the observation of various operational parameters of the reactor. For example, fouling may be indicated by deviations from the set reaction temperature or increased demand on a coolant system to maintain the set temperature value of the reactor, increased motor load as a pump or other mixing device attempts to maintain a velocity within the reactor sufficient to keep the polymer and catalyst particles suspended in the diluent, or attempts to compensate for restriction or obstruction of a flow path. Similarly, a high pressure differential may be observed at a pump and may indicate the presence of a foul. Thus, substantially constant reaction temperatures, substantially constant pump load (or other load for a mixing device), substantially constant pressure differentials, substantially constant flow rates, and so forth, may be indications of the ability to mitigate fouling.

Because these monitored parameters are typically associated with values, such as temperatures, pressures, loads, and so forth, it may be possible to quantify the degree to which a particular component may mitigate fouling. Further, it may be possible to mitigate fouling in real-time (e.g., during a polymerization run) by observing these parameters and making adjustments to feedstocks accordingly. For example, the control system 90 of FIG. 2 may monitor operational parameters of the loop slurry reactor 60 and, in response to fouling indicators, may increase a concentration of the fouling reduction agent 16 relative to the catalyst 78 in the precontacted mixture 22, in the reactor 60, or both.

The degree of fouling mitigation ability may be quantified, at least to some extent, by determining the stability of these measured parameters (e.g., the stability of the reaction temperature, the pressure differential across various pumps, the flow rates through the reactor, or any combination thereof) relative to similar types of values observed in other polymerization runs where fouling has occurred, and relative to other polymerization runs where other components that may have similar effects on the polymerization process are employed. In this way, potential fouling reduction agents and/or catalyst compositions may be directly compared to one another such that a relative and/or absolute degree or scale may be generated for different potential fouling reduction agents. Thus, each potential fouling reduction agent may be associated with a value or some other indication representing the ability of the particular agent to mitigate fouling for a particular type of polymerization under a particular set of conditions.

While a potential fouling reduction agent may be able to mitigate fouling to varying degrees, it should be appreciated that other, more desirable processes in the reaction should not be correspondingly mitigated. Of particular concern is the activity and/or productivity of the catalyst 78, and, more particularly, the activity and/or productivity of the catalyst composition that is generated before polymerization is initiated (e.g., by introduction of the catalyst composition into a reaction zone of the reactor under polymerization conditions). Generally, it would be most desirable for the fouling reduction agent 16 to completely mitigate fouling while also enabling the catalyst system to have the same or enhanced activity and/or productivity as when the fouling reduction agent 16 is not present. However, the present inventors have found that mitigating fouling must be balanced with maintaining catalyst activity and/or productivity such that acceptable levels of both are achieved. The present inventors have also identified a particular set of compounds that are surprisingly well-suited for fouling mitigation while enabling a substantial maintenance of catalyst activity and/or productivity.

With respect to determining whether a particular compound is able to maintain catalyst activity and/or productivity, there exist a variety of methods used to determine catalyst activity and/or productivity that are well-known to those skilled in the art, including measuring the kinetics of the polymerization process. However, one method in accordance with present embodiments may involve measuring the relative activities and/or productivities between a catalyst composition where the catalyst 78 is not precontacted with the fouling reduction agent 16 and a catalyst composition where the catalyst 78 is precontacted with the fouling reduction agent 16.

The method may include performing a baseline polymerization reaction. In the baseline reaction, a non-continuous polymerization reaction is performed without the potential fouling reduction agent and without intentionally introducing any components that would otherwise cause fouling (e.g., water). The output of the reaction is then observed. The observed/measured outputs may be the quantity of polymer produced, though other outputs such as various properties of the polymer (e.g., comonomer incorporation, stereochemistry, $M_w$ molecular weight, $M_n$ molecular weight, and other physical and mechanical properties) are also contemplated. In measuring the amount of polymer produced, a baseline activity and/or productivity of the catalyst system may be established in that an amount of polymer expected from the particular system in a particular amount of time may be established.

The method may then include performing the same polymerization reaction (e.g., using the same feedstock and the same conditions, and for the same amount of time) in the presence of water and the fouling reduction agent 16, referred to herein as a test polymerization reaction. Normally, if the fouling reduction agent 16 were not present, a foul would occur due to the presence of water. For example, the inventors have observed that the polymerization reaction begins to quickly heat, and a hard foul is then observed. In this type of fouling, solid polymer adheres to reactor walls and various mixing devices. When the fouling reduction agent 16 is present (of suitable type and amount), however, this fouling does not occur. The output of the test polymerization reaction may then be observed and compared to the output of the baseline polymerization reaction. For instance, the amount of polymer recovered from the test polymerization reaction within a period of time may be compared to the amount of polymer recovered from the baseline polymerization reaction within that same period of time to determine the relative activity and/or productivity of the catalyst system between the two reactions.

By way of example, if the test polymerization reaction produces an amount of polymer that is within a certain percentage of the amount of polymer produced by the baseline polymerization reaction, the fouling reduction agent 16 employed in the test polymerization reaction may be referred to as maintaining the activity and/or productivity of the catalyst system to within that percentage of its baseline activity and/or productivity. Thus, a catalyst composition employing the fouling reduction agent 16 that produces 99% of the amount of polymer that would be obtained without the fouling reduction agent 16 (and in the absence of any fouling condition) would be considered to maintain catalyst activity and/or productivity to within 99% of its baseline activity and/or productivity.

Again, the fouling reduction agent 16 may display these effects in many different types of metallocene catalyst systems, including those that employ activator-supports (e.g., acidic solid oxide supports), organoaluminum cocatalysts, organoaluminoxane cocatalysts, and other ionizing components, including those described above. Indeed, as noted above, surprisingly, tetraalkylammonium salts may exhibit superior overall performance compared to other compounds when considering the mitigation of water-based fouling and catalyst activity and/or productivity maintenance. It is presently recognized that effective ranges for tetraalkylammonium halides are generally lower than the ranges typically employed for additives that are directly injected into the reactor, and exhibit better overall performance regarding water-based fouling mitigation when used in accordance with the present techniques.

In terms of weight percentage of a polymerization reaction, example weight percentages of the tetraalkylammonium alkyl salts effective for fouling mitigation and catalyst maintenance may be 100 ppm or less, based on the weight of the diluent employed in the reactor. For example, ranges of between 100 ppm and 0.001 ppm may generally be used. By way of specific example with respect to commercial-scale polyethylene production, ranges between 10 ppm and 5.0 ppm may be effective at mitigating fouling, but may also reduce catalytic activity and/or productivity (due to the relative abundance of the ammonium alkyl relative to the catalyst compound). Ranges between 5 ppm and 0.05 ppm may provide a balance between fouling mitigation and catalytic activity and/or productivity, and ranges between 0.05 ppm and 0.001 ppm, while effective for maintaining catalyst activity and/or productivity, may not necessarily adequately mitigate fouling. It has been identified that ranges between 0.1 ppm and 2.0 ppm, based on the weight of the diluent in the reactor, may be particularly effective for tetraalkylammonium salts such as tetra(n-butyl)ammonium chloride and tetra(n-dodecyl)ammonium chloride. By way of non-limiting example, between 0.2 ppm and 0.8 ppm, or between 0.4 ppm and 0.5 ppm may be effective amounts for tetra(n-dodecyl)ammonium chloride, and between 0.5 ppm and 1.1 ppm, or between 0.8 ppm and 1.0 ppm may be effective for tetra(n-butyl) ammonium chloride.

B. Water Tolerance

As noted above, the fouling reduction agent 16 used according to the present technique may be particularly useful for mitigating fouling due to the presence of water, while also maintaining catalyst activity and/or productivity. In this way, the fouling reduction agent 16, when contacted with the catalyst 78 in preparing a catalyst composition, enables the catalyst composition to be more tolerant to the presence of water compared to a catalyst composition that has not been prepared by contacting the catalyst 78 with the fouling reduction agent 16. The robustness of the catalyst composition to the presence of water may be determined, at least in part, by the amount of fouling reduction agent 16 used relative to the catalyst 78, and the amount of water that the catalyst composition is able to tolerate while still producing an acceptable amount of polymer.

While not being bound by theory, it is believed that in one embodiment, the fouling reduction agent 16, which may include a particular type of ammonium salt, may prevent the metallocene from being solubilized. The contact product produced from contacting the fouling reduction agent 16 and the metallocene may, in such embodiments, be more tolerant of water during polymerization. In one embodiment, water may be blocked from interacting with the metal center or other coordinated ligands of the metallocene, which is believed to result in fouling. Indeed, as noted above, it is believed that water can cause a metallocene catalyst to degrade and/or become solubilized.

Thus, the ability of the fouling reduction agent 16 to enable the catalyst composition to tolerate certain amounts of water may be represented by, for example, an amount of the particular fouling reduction agent 16 suitable for offsetting a particular amount of water for a particular catalyst composition. In one embodiment, this may include representing the tolerance of a particular catalyst composition, formed at least in part by precontacting the fouling reduction agent 16 and the catalyst 78, to water relative to the baseline water tolerance of the catalyst composition (i.e., where no fouling reduction agent 16 is used). The representation may include denoting a molar or weight ratio of the fouling reduction agent 16 to the active component of the catalyst 78 (e.g., the metallocene structure) and a molar or weight ratio of the water to the active component of the catalyst 78, and comparing the activity and/or productivity of the catalyst system obtained relative to baseline catalyst activity and/or productivity when no fouling reduction agent 16 is used and no water is separately introduced. It should be noted that in performing the baseline polymerization reaction, some water may be present in very small amounts in certain of the feedstocks 14. However, using the same feedstocks 14 for both the test and baseline reactions may offset these minor contaminations.

Regardless of its particular mode of action, certain fouling reduction agents 16, such as those described below, may enable the catalyst system to tolerate the presence of water in an amount that would otherwise cause a significant foul, while still enabling substantially unchanged catalyst activity and/or productivity (e.g., to within between 95% and 100% of its baseline activity and/or productivity). It is believed, therefore, that the catalyst compositions produced in accordance with present embodiments will be able to better tolerate variations in the feedstocks 14, particularly variations in which water may be introduced.

By way of non-limiting example, in accordance with present embodiments, certain of the fouling reduction agents 16 may maintain the activity and/or productivity of the catalyst to within between 90% and 100% of its baseline activity and/or productivity while tolerating water in a water to metallocene mol ratio of between approximately 0.0001 mol water to approximately 1 mol metallocene and approximately 0.01 mol water to approximately 1 mol metallocene. By way of example, the fouling reduction agents 16 may enable the tolerance of water within a reactor, based on the weight of solvent/diluent in the reactor, in amounts up to about 5 ppm, such as between 1 and 4 ppm, between 1 and 3 ppm, or between 1 and 2 ppm. As an example of what this represents in terms of the operation of a polymerization reactor, an incoming feedstock (e.g., a diluent injection), representing approximately 10% of the total contents of the reactor and having approximately 10 ppm water, may be tolerated when fouling reduction agents 16, such as tetraalkylammonium salts, are used in accordance with the present technique. It should be appreciated that the tolerance of 10 ppm of water in a given feedstock may represent significant operational flexibility and significant fouling mitigation, where that same 10 ppm of water would otherwise cause a total foul of the reactor.

Again, in some embodiments, the mol ratio of tetraalkylammonium halide to metallocene compound (in the reactor and/or the precontactor) may generally be between approximately 0.01 mol tetraalkylammonium halide to 1.0 mol of metallocene compound and approximately 1.0 mol tetraalkylammonium halide to 1.0 mol of metallocene compound. In order to mitigate fouling as a result of water while also enabling catalyst activity and/or productivity to be substantially maintained, mol ratios of between 0.05 to 1 and 0.5 to 1 may be particularly preferred, with between approximately 0.1 mol and 0.2 mol fouling reduction agent 16 to 1 mol catalyst 78 being particularly effective for tetra(n-dodecyl)ammonium chloride and tetra(n-butyl)ammonium chloride, as discussed in Section IV.C. It has also been found, surprisingly, that catalyst activity and/or productivity may be enhanced relative to baseline activity and/or productivity, and water-based fouling may be mitigated completely when tetra(n-dodecyl)ammonium chloride is used as the fouling reduction agent 16 when used in these amounts.

Furthermore, it has also been found that certain mol ratios within these ranges may enable catalyst activity and/or productivity maintenance (e.g., to within between 95% and 100% of baseline activity and/or productivity), while mol ratios outside of these ranges may suffer from insufficient fouling mitigation and/or catalyst activity and/or productivity. Indeed, as noted in the examples below, in some embodiments, catalyst activity and/or productivity may be enhanced relative to baseline. In certain embodiments, this may be due to the mitigation of the effect of any contaminant water in the feedstocks 14 utilized for the baseline polymerization reaction on the catalyst composition's baseline activity and/or productivity. In other words, not only are certain fouling reduction agents 16 able to mitigate the water added in the test runs, but certain of these compounds are also able to enhance catalyst activity.

C. Absolute Activity and/or Productivity of the Catalyst Composition

Because the weight of the catalyst 78 may be largely determined by the weight of the solid support on which the active metal of the catalyst 78 is supported, the catalyst activity may be represented by the measurement of grams of polymer (e.g., polyethylene) produced per gram of chemically treated solid oxide per hour (abbreviated gP/(g CTSO·hr)). The catalytic activity and/or productivity of the catalyst composition of the present disclosure, formed by contacting the catalyst 78 (or catalyst system produced using the catalyst 78) with the fouling reduction agent 16, may be greater than or equal to about 1000 gP/(g CTSO·hr), greater than or equal to about 3000 gP/(g CTSO·hr), greater than or equal to about 6000 gP/(g CTSO·hr), or greater than or equal to about 9000 gP/(g CTSO·hr). Activity and/or productivity may be measured under slurry polymerization conditions using isobutane as the diluent, with a polymerization temperature from about 80° C. to about 100° C., and an ethylene pressure of about 340 psig to about 550 psig. The reactor should have substantially no indication of any wall scale, coating or other forms of fouling when making these measurements.

EXAMPLES

The following are real working examples of embodiments of the present technique. While the examples set forth below are demonstrative of the effects of the present technique, the examples should not be construed as limiting the scope of the present disclosure. In particular, a series of polymerization experiments are discussed below, and demonstrate how certain added fouling reduction agents can significantly reduce or eliminate fouling induced by water during a standard ethylene, hexene copolymer run in a 1 gallon batch reactor, with stirring performed using a motor-driven impeller. It should be noted that the various mixing of components before heating and the introduction of pressurized ethylene is considered to be representative of the conditions within a precontactor.

All experiments set forth below were performed using a single metallocene, the structure of which is shown below:

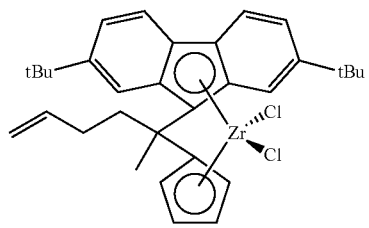

This metallocene may be prepared, for example, according to the processes outlined in U.S. Pat. No. 7,064,225, which is incorporated by reference herein in its entirety for all purposes. 10 wt % STADIS 450® antistatic additive was obtained from Octel Starreon of Newark, Del. Other reaction components used for the below examples were obtained from standard suppliers or using the techniques described in the references incorporated above.

The polymerizations described below were run under the same conditions of temperature (80° C.), pressure of ethylene (450 psig), and no added hydrogen. 1-hexene was used as comonomer using either 38 g or 40 g, with the same amount being used between any directly comparative reactions. The metallocene compound was used in an amount of 3 milligrams, and sulfated alumina was used in an amount between 60 mg and 80 mg. Triisobutylaluminum was used as a cocatalyst, and was generally introduced by adding approximately 0.6 mL of 15 wt % triisobutylaluminum (TIBA) in hexanes. Standard polymerizations using these reagents, accounting for slight variations in each feedstock, are generally expected to produce between 250 grams and 350 grams of polyethylene polymer.

In the fouling experiments below, water was added with TIBA, and 1 mL of TIBA was used in these instances. All reactions were performed in 2 L isobutane (about 5 kg) as the reaction medium, and were run for approximately 30 minutes. Example 1 was run for only 15 minutes due to fouling. The mitigation of fouling was determined based on an observation of reaction temperature and the nature of the reaction vessel after the polymerization experiments were performed.

Example 1

To first establish the effect of water on the polymerization reaction, a control experiment was run where no fouling reduction agent was added. In this control experiment, the standard polymerization conditions noted above were used, and 3 microliters of water were added to 1 mL of TIBA. The resulting mixture was then added to the reactor. After approximately 15 minutes of polymerization time, the temperature of the reaction was observed to be much hotter than a standard run. The reaction was then terminated, and the reactor was opened. The reactor showed a hard foul where polymer totally covered the impeller in a spherical shape, forming a "lollipop" structure. 290 g of PE was ultimately recovered.

Example 2

Having established that the addition of 3 microliters of water was more than sufficient to cause fouling, subsequent polymerizations were performed using 2 microliters. In a first comparative experiment, Example 2, 2 microliters of water was added to 1 mL of TIBA. 0.1 mL of 10 wt % STADIS 450® additive was then added to the resulting mixture before the introduction of ethylene and before heating the reaction. After 30 minutes, the reaction was opened and it was observed that fouling was nearly completely mitigated, with less than approximately 1% of the polymer being adhered to the reactor walls or impeller. However, catalyst activity/productivity was somewhat diminished, with 209 g PE being recovered. This nevertheless may constitute an unexpected result in that the STADIS 450® was able to control fouling due to water, while STADIS 450® would typically be limited to a use for controlling static in a polymerization reactor to reduce static-based fouling. The present inventors have therefore found that the STADIS 450® additive may be used as a part of a catalyst composition, and may provide control over fouling caused by water (which may affect the catalyst, as opposed to affecting the polymer as is the case with static).

Examples 3-5

As noted above, tetraalkylammonium salts provide surprisingly good fouling mitigation ability when used in accordance with the present technique, as displayed by the results discussed below. For Examples 3-5, a saturated stock solution of tetra(n-butyl)ammonium chloride in toluene was prepared, and a specific amount of this solution was charged into the reactor before each polymerization run. In these experiments, 2 microliters of water were added to 1 mL of TIBA, and the resulting mixture was added to the reactor before polymerization was initiated.

In a first run using tetra(n-butyl)ammonium chloride, Example 3, 0.5 mL of the saturated solution was added before the introduction of ethylene and before heating the reaction. After approximately 30 minutes, the reaction was opened and it was observed that fouling was not completely mitigated, with between approximately 1% and 2% of the polymer being adhered to the reactor walls and impeller. However, catalyst activity/productivity was substantially maintained, with 256 g PE being recovered.

In a second run using tetra(n-butyl)ammonium chloride, Example 4, 1.0 mL of the saturated solution was added before the introduction of ethylene and before heating the reaction. After approximately 30 minutes, the reaction was opened and it was observed that fouling was totally mitigated in that the reactor walls and impeller were completely free of polymer. However, catalyst activity/productivity was significantly reduced, with less than 100 g PE being recovered.

In a third run using tetra(n-butyl)ammonium chloride, Example 5, 0.6 mL of the saturated solution (representing less than 1 ppm tetra(n-butyl)ammonium chloride, approximately 0.9 ppm based on the weight of the isobutane) was added before the introduction of ethylene and before heating the reaction. After approximately 30 minutes, the reaction was opened and it was observed that fouling was nearly completely mitigated, with less than approximately 1% of the polymer being adhered to the reactor walls and the impeller. Catalyst activity/productivity was also completely maintained, with 313 g PE being recovered. It should be appreciated that the results above relating to the use of tetra(n-butyl)ammonium chloride to control the fouling normally caused by water is quite unexpected. In addition, tetra(n-butyl)ammonium chloride proved to be significantly better than the STADIS 450® antistatic additive when considering the combination of fouling mitigation and catalyst activity/productivity.

Examples 6 and 7

For Examples 6 and 7, a saturated stock solution of tetra(n-dodecyl)ammonium chloride in toluene was prepared, and a specific amount of this solution was charged into the reactor before each polymerization run. In these experiments, 2 microliters of water were added to 1 mL of TIBA, and the resulting mixture was added to the reactor before polymerization was initiated.

In a first run using tetra(n-dodecyl)ammonium chloride, Example 6, 0.25 mL of the saturated solution was added (representing less than 1 ppm tetra(n-dodecyl)ammonium chloride, approximately 0.45 ppm based on the weight of the isobutane) to a mixture of the TIBA, water, the metallocene, and the sulfated alumina. After approximately 30 minutes of polymerization, the reaction was opened and it was observed that fouling was totally mitigated, with no more than a trace amount of polymer being adhered to the impeller and reactor walls. Catalyst productivity was substantially maintained, with 272 g of PE being produced.

In a second run using tetra(n-dodecyl)ammonium chloride, Example 7, 0.25 mL of the saturated solution was added (again representing less than 1 ppm tetra(n-dodecyl)ammonium chloride, based on the weight of the isobutane) first to a mixture of the TIBA and water, and this resulting mixture was added to the polymerization reactor having a mixture of the metallocene and the sulfated alumina. After approximately 30 minutes of polymerization, the reaction was opened and it was observed that fouling was totally mitigated, with no more than a trace amount of polymer being adhered to the impeller and reactor walls. Catalyst productivity was totally maintained and may even be considered to have been enhanced, with 362 g of PE being produced. This is surprising in that a greater amount of polymer was obtained from this reaction than would normally be expected from a standard polymerization run using no tetraalkylammonium salt. Interestingly, the polymerization reaction also appeared to benefit from precontacting the TIBA/water solution with the tetra(n-dodecyl)ammonium chloride before the TIBA/water solution was able to contact the catalyst, which could indicate that the tetra(n-dodecyl)ammonium chloride may prevent water from deleteriously interacting with the metallocene compound. As with the tetra(n-butyl)ammonium chloride, tetra(n-dodecyl)ammonium chloride proved to be significantly better than STADIS 450® antistatic additive at maintaining catalyst activity/productivity while mitigating fouling.

Additional Description

As discussed above, present embodiments relate to the preparation and use of a catalyst composition formed by contacting a fouling reduction agent, which may include an ammonium salt (e.g., a tetraalkylammonium salt), with a catalyst (e.g., a metallocene catalyst). The following clauses are offered as further description of the present disclosure, and are intended to cover any and all combinations of the embodiments set forth above.

Embodiment 1

A method, comprising: introducing a catalyst composition formed within a precontactor into a polymerization zone of a polymerization reactor; and polymerizing, within the polymerization zone, an olefin monomer using the catalyst composition to produce a polyolefin polymer; and wherein the catalyst composition formed within the precontactor comprises a contact product of contact components comprising: an olefin polymerization catalyst; and an agent comprising an ammonium salt, wherein the catalyst composition has a greater catalyst activity in the presence of water than if no ammonium salt were present.

Embodiment 2

The method of embodiment 1, wherein the olefin polymerization catalyst comprises a metallocene catalyst.

Embodiment 3

The method of any preceding embodiment, wherein the ammonium salt has the formula: (R1)(R2)(R3)(R4)N(X), wherein: N is nitrogen; R1, R2, R3, and R4 are independently selected from a hydrogen, an aliphatic group having from 1 to 20 carbons, or an aryl group having from 1 to 20 carbons; and X is an anion.

Embodiment 4

The method of any preceding embodiment, wherein the ammonium salt is a tetraalkylammonium salt, each alkyl having, independently, from 1 to 20 carbons.

Embodiment 5

The method of any preceding embodiment, wherein the ammonium salt is a tetraalkylammonium chloride salt, each alkyl having, independently, from 4 to 12 carbons.

Embodiment 6

The method of any preceding embodiment, wherein the ammonium salt is tetrabutylammonium chloride or tetradodecylammonium chloride.

Embodiment 7

The method of embodiments 1 or 2, wherein the ammonium salt is an ionic liquid at standard temperature and pressure.

Embodiment 8

The method of any preceding embodiment, comprising introducing the olefin polymerization catalyst and the agent separately into the precontactor such that they first contact within the precontactor.

Embodiment 11

The method of any preceding embodiment, wherein a molar ratio of the ammonium salt to the olefin polymerization catalyst is between 0.05 to 1 and 0.5 to 1.

Embodiment 12

The method of any preceding embodiment, wherein the polymerization reactor comprises a loop slurry polymerization reactor.

Embodiment 13

The method of any preceding embodiment, comprising introducing an antistatic agent directly into the polymerization zone.

Embodiment 14

A catalyst composition, comprising: a contact product produced from contact components, comprising: an olefin polymerization catalyst; and an ammonium salt having the formula: (R1)(R2)(R3)(R4)N(X), wherein: N is Nitrogen; R1, R2, R3, and R4 are independently selected from a hydrogen, an aliphatic group having from 1 to 20 carbons, or an aryl group having from 1 to 20 carbons; and X is an anion.

Embodiment 15

The catalyst composition of embodiment 14, wherein the olefin polymerization catalyst comprises an organoaluminoxane, a metallocene, or a combination thereof.

Embodiment 16

The catalyst composition of either of embodiments 14 or 15, wherein X is F, Cl, Br, I, a hydroxide, a sulfate, or a phosphate.

Embodiment 17

The catalyst composition of any of embodiments 14-16, wherein each of $R^1$, $R^2$, $R^3$, and $R^4$ are an alkyl group independently having from 1 to 20 carbons.

Embodiment 18

The catalyst composition of any of embodiments 14-17, wherein each of $R^1$, $R^2$, $R^3$, and $R^4$ are an alkyl group independently having from 4 to 12 carbons.

Embodiment 19

The catalyst composition of any of embodiments 14-18, wherein the ammonium salt is tetrabutylammonium chloride or tetradodecylammonium chloride.

Embodiment 20

The catalyst composition of any of embodiments 14-19, wherein the contact components comprise a solid super acid (SSA), a trialkylaluminum, or an organoaluminoxane, or any combination thereof.

Embodiment 21

The catalyst composition of any of embodiments 14-20, wherein a molar ratio of the ammonium salt to the olefin polymerization catalyst is between 0.05 to 1 and 0.5 to 1.

Embodiment 22

A system, comprising a polymerization reactor comprising an olefin monomer, a catalyst composition, and a diluent, wherein the polymerization reactor subjects the olefin monomer to polymerization conditions in the presence of the catalyst composition to produce a polyolefin; a precontactor coupled to an inlet of the polymerization reactor, wherein the precontactor comprises contact components that form the catalyst composition, the contact components comprising: an olefin polymerization catalyst; and an agent comprising an ammonium salt such that the catalyst composition has a greater catalyst activity in the presence of water than if no ammonium salt were present.

Embodiment 23

The system of embodiment 22, wherein the polymerization reactor is a loop slurry reactor.

Embodiment 24

The system of embodiments 22 or 23, comprising a control system having one or more tangible, non-transitory, machine-readable media collectively storing instructions executable by a processor to: monitor conditions within the polymerization reactor for indicators of an incipient reactor foul; adjust an amount of the fouling reduction agent relative to the olefin polymerization catalyst within the precontactor in response to an indicator of an incipient reactor foul; and controllably introduce the catalyst composition into the polymerization reactor from the precontactor.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method, comprising:
introducing a catalyst composition formed within a precontactor into a polymerization zone of a polymerization reactor; and
polymerizing, within the polymerization zone, an olefin monomer using the catalyst composition to produce a polyolefin polymer;
wherein the catalyst composition formed within the precontactor comprises a contact product of contact components comprising:
an olefin polymerization catalyst; and
an agent comprising an ammonium salt; and
wherein the catalyst composition has a greater catalyst activity in the presence of water than the olefin polymerization catalyst where the ammonium salt is not present.

2. The method of claim 1, wherein the olefin polymerization catalyst comprises a metallocene catalyst.

3. The method of claim 1, wherein the ammonium salt has the formula:

$(R^1)(R^2)(R^3)(R^4)N(X)$, wherein:

N is Nitrogen
$R^1$, $R^2$, $R^3$, and $R^4$ are independently selected from a hydrogen, an alkyl, branched alkyl, cycloalkyl, aryl, or alkenyl group having from 1 to 20 carbons; and
X is an anion.

4. The method of claim 1, wherein the ammonium salt is a tetraalkylammonium salt, each alkyl having, independently, from 1 to 20 carbons.

5. The method of claim 1, wherein the ammonium salt is a tetraalkylammonium halide salt, each alkyl having, independently, from 4 to 12 carbons.

6. The method of claim 1, wherein the ammonium salt is tetrabutylammonium chloride or tetradodecylammonium chloride.

7. The method of claim 1, wherein the ammonium salt is an ionic liquid at standard temperature and pressure.

8. The method of claim 1, comprising introducing the olefin polymerization catalyst and the agent separately into the precontactor such that they first contact within the precontactor.

9. The method of claim 1, comprising introducing the olefin polymerization catalyst and the agent together as a single stream into the precontactor such that they first contact before introduction into the precontactor.

10. The method of claim 1, wherein a molar ratio of the ammonium salt to the olefin polymerization catalyst is between 0.01 to 1.0 and 1 to 1.

11. The method of claim 1, wherein a molar ratio of the ammonium salt to the olefin polymerization catalyst is between 0.05 to 1 and 0.5 to 1.

12. The method of claim 1, wherein the polymerization reactor comprises a loop slurry polymerization reactor.

13. The method of claim 1, comprising introducing an antistatic agent directly into the polymerization zone.

14. A catalyst composition comprising:
a contact product produced from contact components comprising:
an olefin polymerization catalyst; and
an ammonium salt having the formula:

$(R^1)(R^2)(R^3)(R^4)N(X)$, wherein:

N is Nitrogen;
$R^1$, $R^2$, $R^3$, and $R^4$ are independently selected from a hydrogen, an aliphatic group having from 1 to 20 carbons, or an aryl group having from 1 to 20 carbons; and
X is an anion.

15. The catalyst composition of claim 14, wherein the olefin polymerization catalyst comprises a metallocene catalyst.

16. The catalyst composition of claim 14, wherein X is F, Cl, Br, I, a hydroxide, a sulfate, or a phosphate.

17. The catalyst composition of claim 14, wherein each of $R^1$, $R^2$, $R^3$, and $R^4$ are an alkyl group independently having from 1 to 20 carbons.

18. The catalyst composition of claim 14, wherein each of $R^1$, $R^2$, $R^3$, and $R^4$ are an alkyl group independently having from 4 to 12 carbons.

19. The catalyst composition of claim 14, wherein the ammonium salt is tetrabutylammonium chloride or tetradodecylammonium chloride.

20. The catalyst composition of claim 14, wherein the olefin polymerization catalyst comprises a metallocene complex and a cocatalyst comprising a solid super acid (SSA), a trialkylaluminum, an organoaluminoxane, or any combination thereof.

21. The catalyst composition of claim 14, wherein a molar ratio of the ammonium salt to the olefin polymerization catalyst is between 0.05 to 1 and 0.5 to 1.

22. A system, comprising:
a polymerization reactor comprising an olefin monomer, a catalyst composition, and a diluent, wherein the polymerization reactor subjects the olefin monomer to polymerization conditions in the presence of the catalyst composition to produce a polyolefin; and a precontactor coupled to an inlet of the polymerization reactor
wherein the precontactor comprises contact components that form the catalyst composition, the contact components comprising:
an olefin polymerization catalyst; and
an agent comprising an ammonium salt such that the catalyst composition has a greater catalyst activity in the presence of water than the olefin polymerization catalyst where the ammonium salt is not present.

23. The system of claim 22, wherein the polymerization reactor is a loop slurry reactor.

24. The system of claim 22, comprising a control system having one or more tangible, non-transitory, machine-readable media collectively storing instructions executable by a processor to:
monitor conditions within the polymerization reactor for indicators of an incipient reactor foul;
adjust an amount of the agent relative to the olefin polymerization catalyst within the precontactor in response to an indicator of an incipient reactor foul; and
controllably introduce the catalyst composition into the polymerization reactor from the precontactor.

\* \* \* \* \*